United States Patent
Hiyama et al.

(10) Patent No.: US 7,058,410 B2
(45) Date of Patent: Jun. 6, 2006

(54) METHOD FOR MANAGING LOCATION INFORMATION, RELATED RELAY DEVICE AND LOCATION INFORMATION MANAGEMENT DEVICE

(75) Inventors: Satoshi Hiyama, Yokohama (JP); Koji Sasada, Kamakura (JP)

(73) Assignee: NTT DoCoMo, Inc., Tokyo (JP)

( * ) Notice: Subject to any disclaimer, the term of this patent is extended or adjusted under 35 U.S.C. 154(b) by 408 days.

(21) Appl. No.: 10/274,843

(22) Filed: Oct. 21, 2002

(65) Prior Publication Data
US 2003/0092443 A1  May 15, 2003

(30) Foreign Application Priority Data
Oct. 23, 2001 (JP) ............................. 2001-325598

(51) Int. Cl.
*H04Q 7/20* (2006.01)
(52) U.S. Cl. ............................ 455/456.1; 455/435.1; 342/357.01
(58) Field of Classification Search ............ 455/422.1, 455/433, 435.1, 456.1; 342/357.01, 45; 340/988, 340/989
See application file for complete search history.

(56) References Cited

U.S. PATENT DOCUMENTS

| 5,577,264 | A | | 11/1996 | Tuohino |
| 5,713,073 | A | | 1/1998 | Warsta |
| 5,937,350 | A | * | 8/1999 | Frank ..................... 455/433 |
| 5,970,408 | A | | 10/1999 | Carlsson et al. |
| 6,272,344 | B1 | | 8/2001 | Kojima |
| 6,625,457 | B1 | * | 9/2003 | Raith .................. 455/456.1 |
| 6,806,814 | B1 | * | 10/2004 | Iverson et al. ............ 340/989 |

FOREIGN PATENT DOCUMENTS

| JP | 5-55991 | 3/1993 |
| JP | 7-30962 | 1/1995 |
| JP | 11-355835 | 12/1999 |
| WO | WO 99/56476 A | 11/1999 |

* cited by examiner

*Primary Examiner*—Quochien B. Vuong
(74) *Attorney, Agent, or Firm*—Brinks Hofer Gilson & Lione

(57) ABSTRACT

A location register 13 stores as location information of a relay device 21 to area identification information of a location registration area where relay device 21 is currently located and stores as location information of one or a plurality of mobile communication terminals 7 transported in a moving object 2, relay device identification information of relay device 21 to thereby subordinate one or more of a plurality of mobile communication terminals 7 to relay device 21. In the case that a master/slave relationship should be discontinued with some of a plurality of mobile communication terminals 7, relay device 21 transmits, to location register 13, a dependency registration removal request specifying the part of a plurality of mobile communication terminals 7. Location register 13 updates location information of the mobile communication terminals 7 specified in the dependency registration removal request to area identification information of a location registration area in which relay device 21 is currently located.

8 Claims, 23 Drawing Sheets

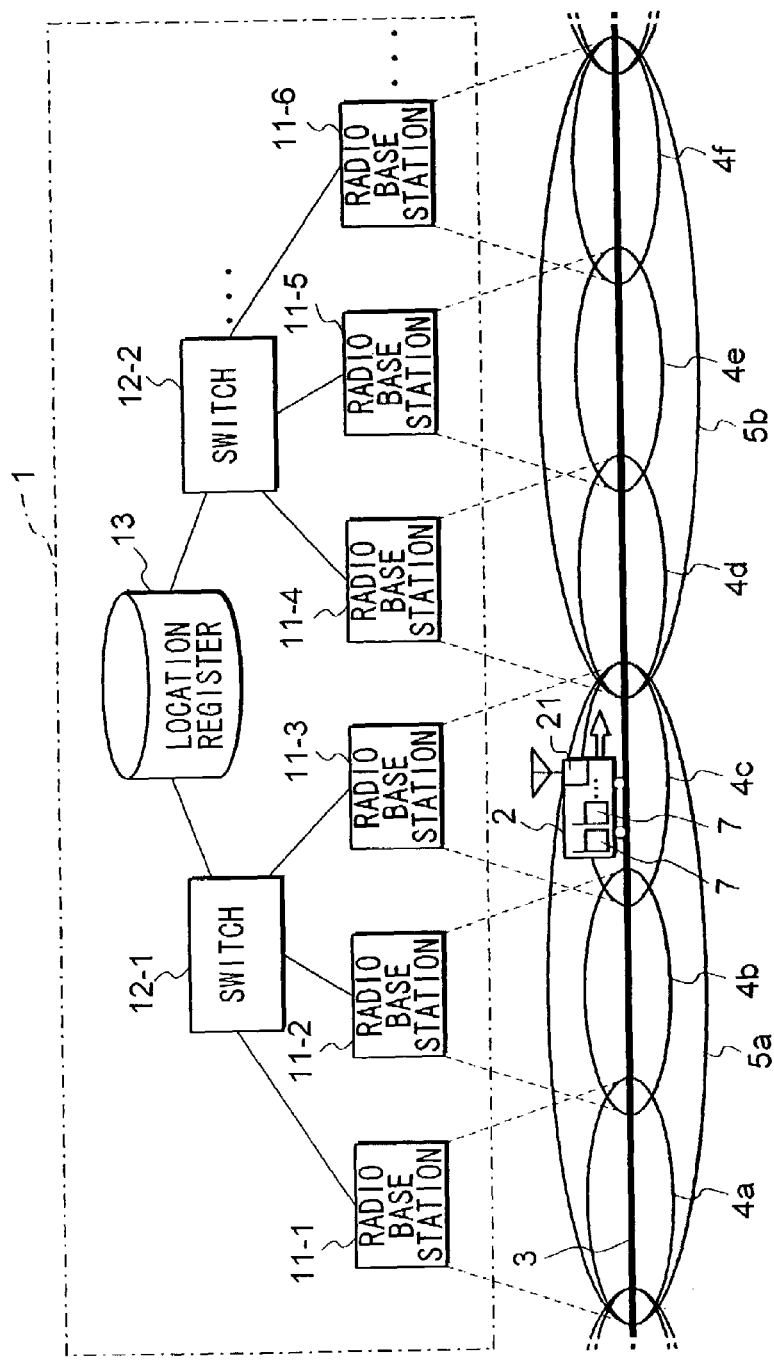

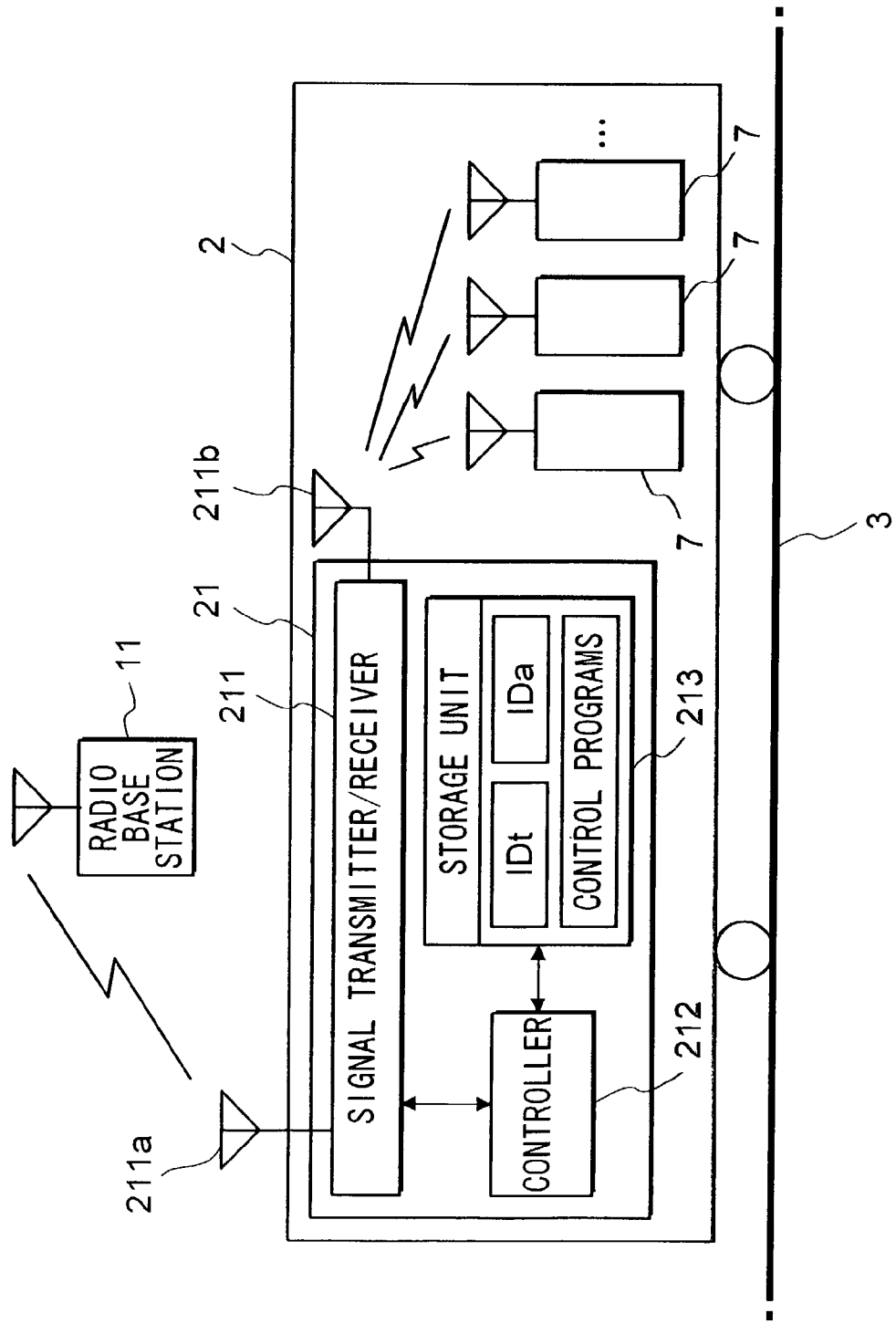

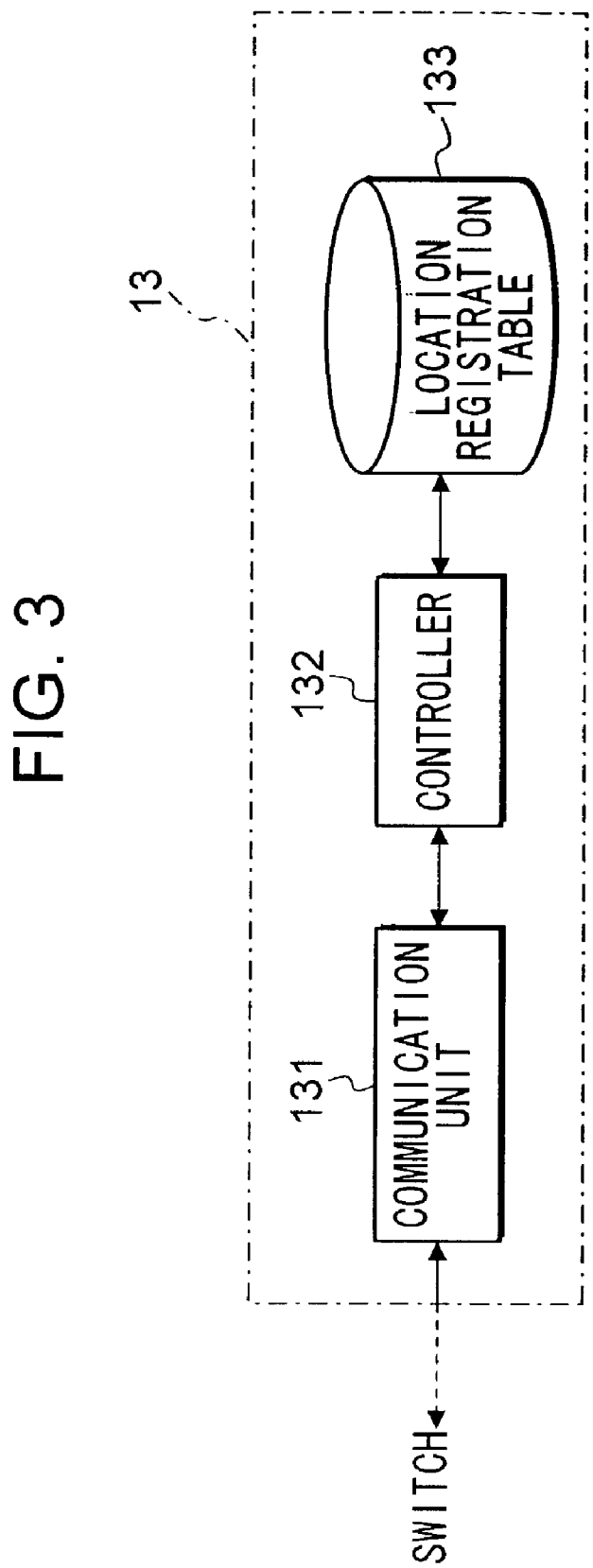

FIG. 4

LOCATION REGISTRATION TABLE

| IDENTIFICATION INFORMATION | LOCATION INFORMATION | |
|---|---|---|
| IDm1 [MOBILE COMMUNICATION TERMINAL 7-1] | IDa1 [LOCATION REGISTRATION AREA 5a] | |
| IDm2 [MOBILE COMMUNICATION TERMINAL 7-2] | IDa1 [LOCATION REGISTRATION AREA 5a] | IDt1 [RELAY DEVICE 21] |
| IDm3 [MOBILE COMMUNICATION TERMINAL 7-3] | IDt1 [RELAY DEVICE 21] | |
| IDm4 [MOBILE COMMUNICATION TERMINAL 7-4] | IDt1 [RELAY DEVICE 21] | |
| ... | ... | ... |
| IDt1 [RELAY DEVICE] | IDa1 [LOCATION REGISTRATION AREA 5a] | |
| IDt2 [RELAY DEVICE] | IDa3 [LOCATION REGISTRATION AREA 5c] | |
| ... | ... | ... |

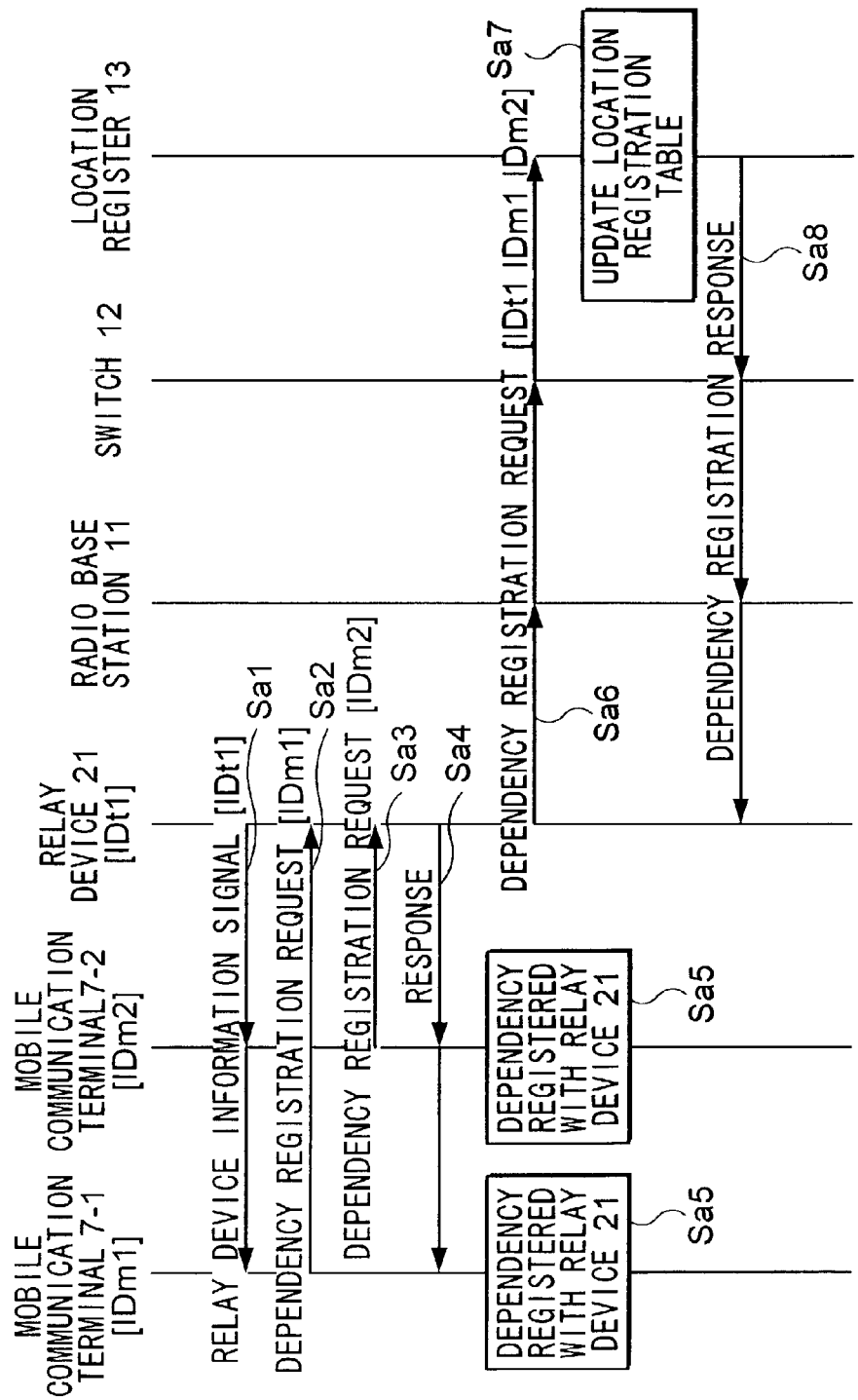

FIG. 7

LOCATION REGISTRATION TABLE

| IDENTIFICATION INFORMATION | LOCATION INFORMATION |
|---|---|
| IDm1 [MOBILE COMMUNICATION TERMINAL 7-1] | IDt1 [RELAY DEVICE 21] |
| IDm2 [MOBILE COMMUNICATION TERMINAL 7-2] | IDt1 [RELAY DEVICE 21] |
| IDm3 [MOBILE COMMUNICATION TERMINAL 7-3] | IDt1 [RELAY DEVICE 21] |
| IDm4 [MOBILE COMMUNICATION TERMINAL 7-4] | IDt1 [RELAY DEVICE 21] |
| ... | ... |
| IDt1 [RELAY DEVICE] | IDa1 [LOCATION REGISTRATION AREA 5a] |
| IDt2 [RELAY DEVICE] | IDa3 [LOCATION REGISTRATION AREA 5c] |
| ... | ... |

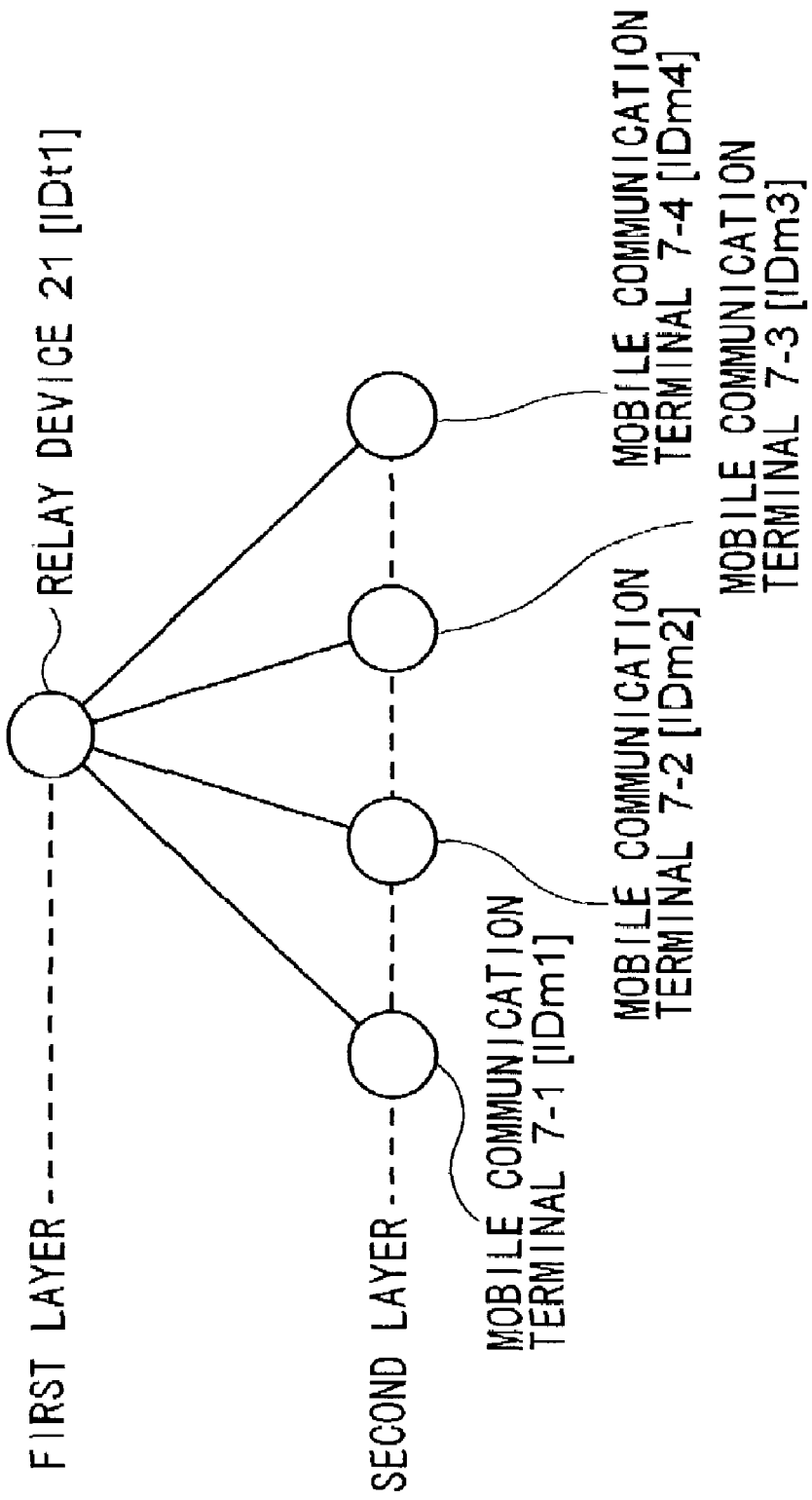

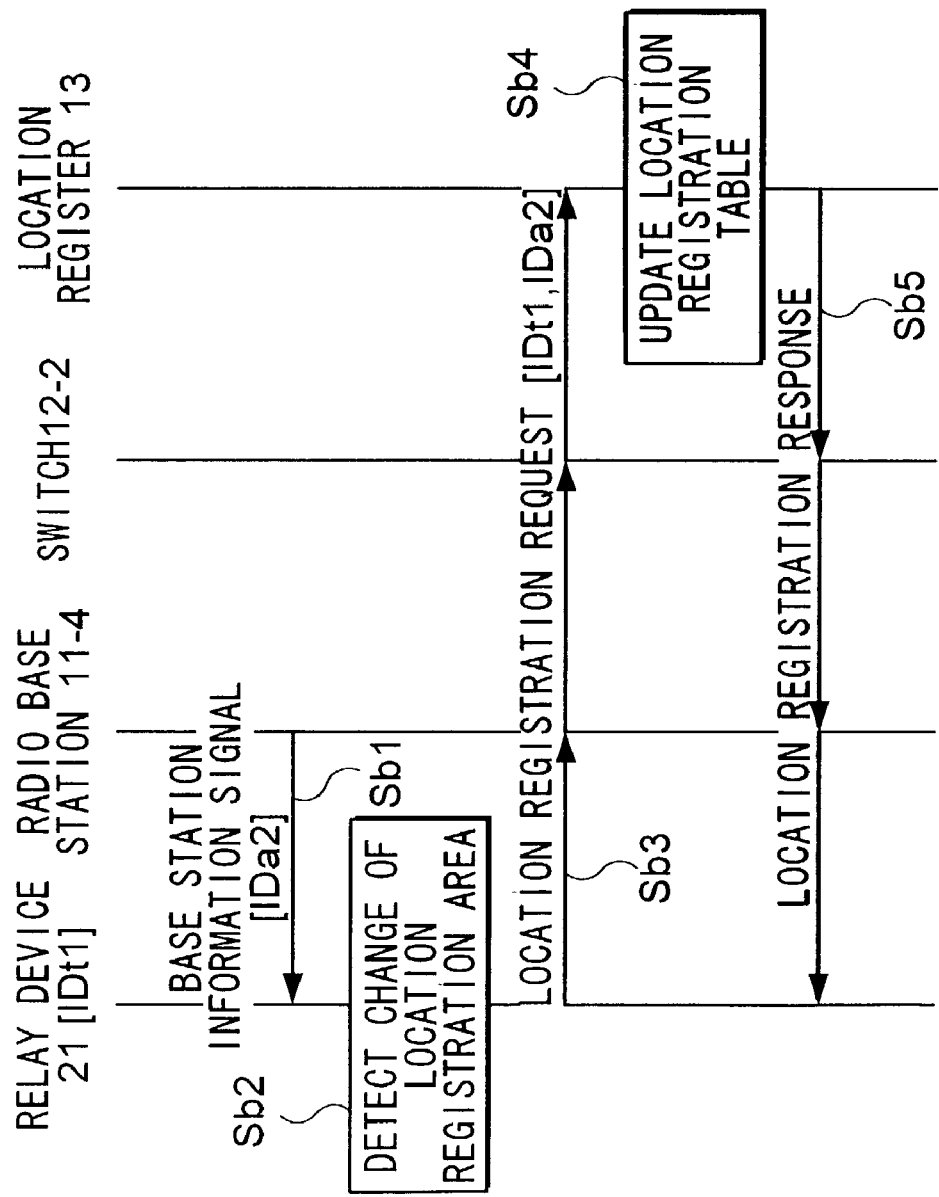

FIG. 10

LOCATION REGISTRATION TABLE

| IDENTIFICATION INFORMATION | LOCATION INFORMATION |
|---|---|
| IDm1 [MOBILE COMMUNICATION TERMINAL 7-1] | IDt1 [RELAY DEVICE 21] |
| IDm2 [MOBILE COMMUNICATION TERMINAL 7-2] | IDt1 [RELAY DEVICE 21] |
| IDm3 [MOBILE COMMUNICATION TERMINAL 7-3] | IDt1 [RELAY DEVICE 21] |
| IDm4 [MOBILE COMMUNICATION TERMINAL 7-4] | IDt1 [RELAY DEVICE 21] |
| ... | ... |
| IDt1 [RELAY DEVICE] | IDa2 [LOCATION REGISTRATION AREA 5b] |
| IDt2 [RELAY DEVICE] | IDa3 [LOCATION REGISTRATION AREA 5c] |
| ... | ... |

FIG. 12

LOCATION REGISTRATION TABLE

| IDENTIFICATION INFORMATION | LOCATION INFORMATION |
|---|---|
| IDm1 [MOBILE COMMUNICATION TERMINAL 7-1] | IDt1 [RELAY DEVICE 21] |
| IDm2 [MOBILE COMMUNICATION TERMINAL 7-2] | IDt1 [RELAY DEVICE 21] |
| IDm3 [MOBILE COMMUNICATION TERMINAL 7-3] | IDa2 [LOCATION REGISTRATION AREA 5b] |
| IDm4 [MOBILE COMMUNICATION TERMINAL 7-4] | IDa2 [LOCATION REGISTRATION AREA 5b] |
| ... | ... |
| IDt1 [RELAY DEVICE 21] | IDa2 [LOCATION REGISTRATION AREA 5b] |
| IDt2 [RELAY DEVICE] | IDa3 [LOCATION REGISTRATION AREA 5c] |
| ... | ... |

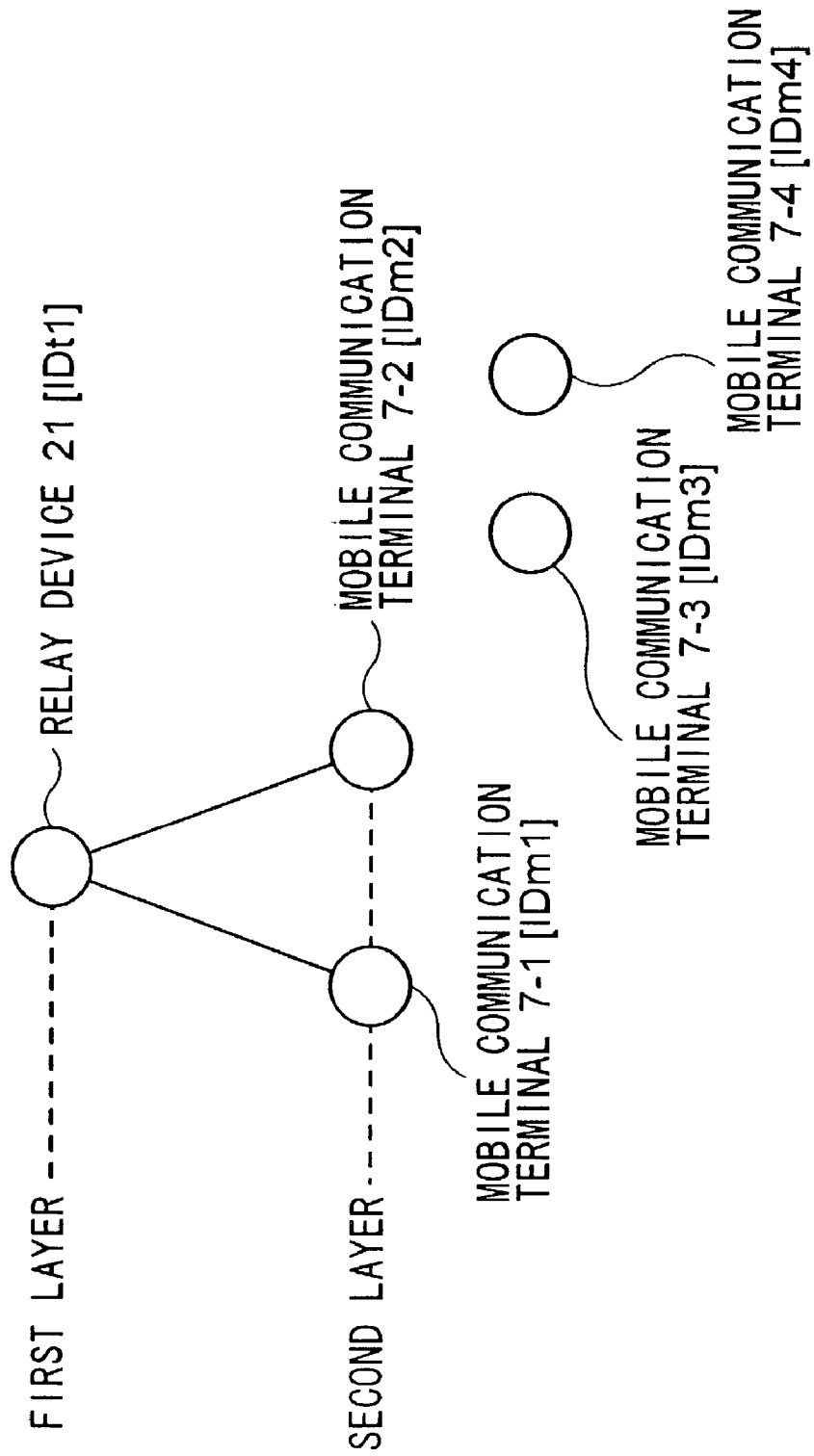

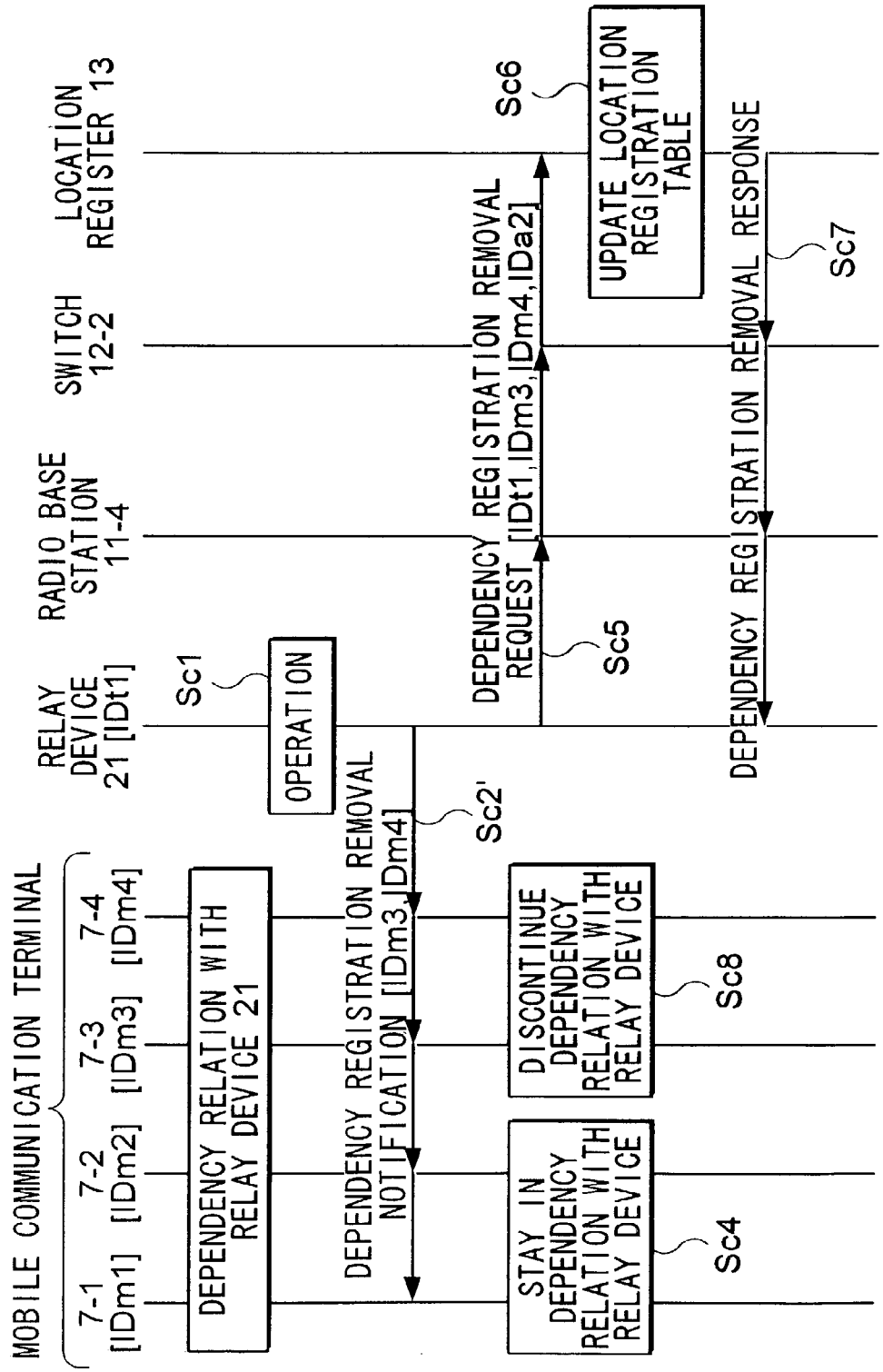

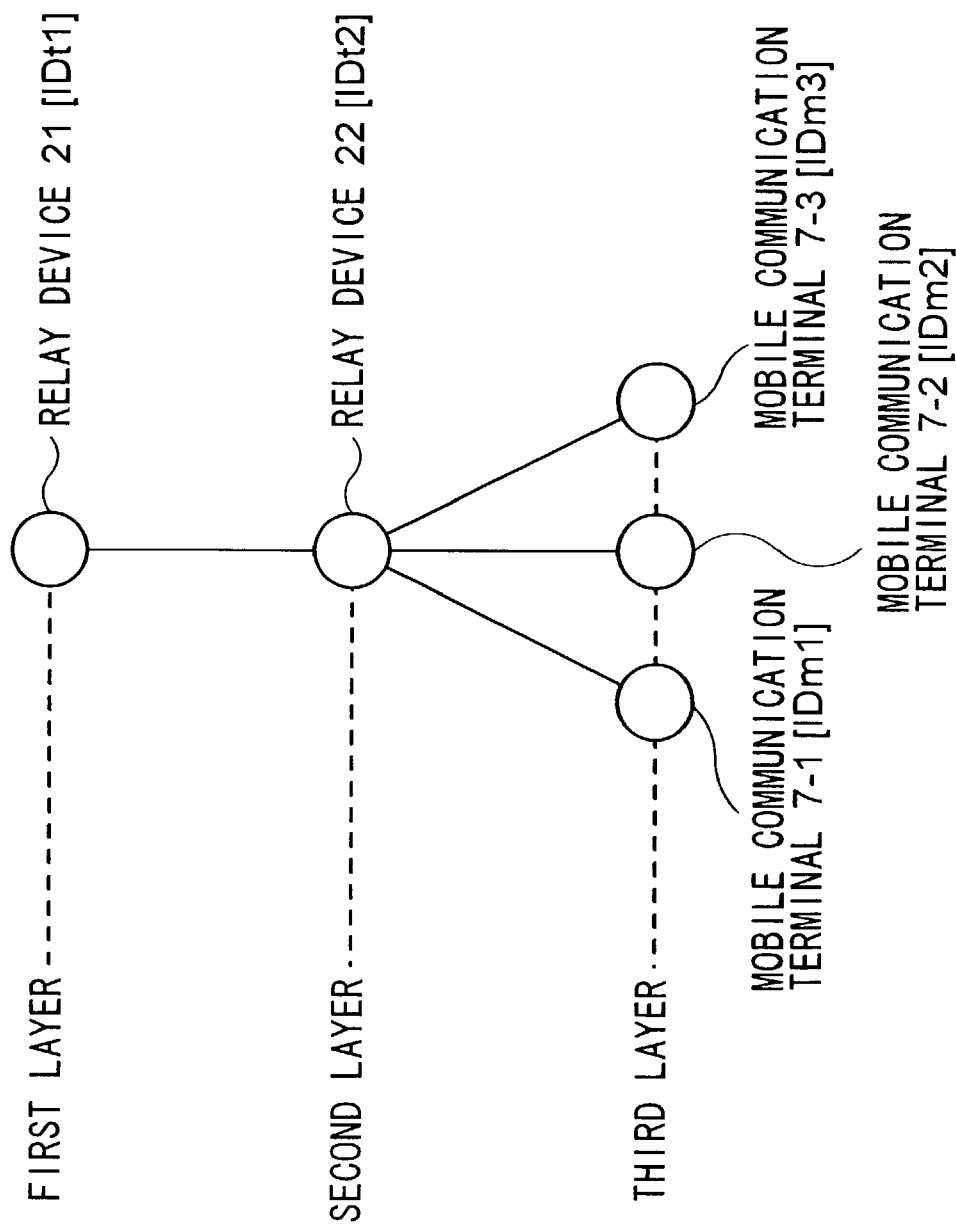

FIG. 16

LOCATION REGISTRATION TABLE

| IDENTIFICATION INFORMATION | LOCATION INFORMATION |
|---|---|
| IDm1 [MOBILE COMMUNICATION TERMINAL 7-1] | IDt2 [RELAY DEVICE 22] |
| IDm2 [MOBILE COMMUNICATION TERMINAL 7-2] | IDt2 [RELAY DEVICE 22] |
| IDm3 [MOBILE COMMUNICATION TERMINAL 7-3] | IDt2 [RELAY DEVICE 22] |
| ... | ... |
| IDt2 [RELAY DEVICE 22] | IDt1 [RELAY DEVICE 21] |
| IDt1 [RELAY DEVICE 21] | IDa1 [LOCATION REGISTRATION AREA 5a] |
| ... | ... |

FIG. 18

LOCATION REGISTRATION TABLE

| IDENTIFICATION INFORMATION | LOCATION INFORMATION |
|---|---|
| IDm1 [MOBILE COMMUNICATION TERMINAL 7-1] | IDt1 [RELAY DEVICE21] |
| IDm2 [MOBILE COMMUNICATION TERMINAL 7-2] | IDt1 [RELAY DEVICE21] |
| IDm3 [MOBILE COMMUNICATION TERMINAL 7-3] | IDt1 [RELAY DEVICE21] |
| ... | ... |
| IDt2 [RELAY DEVICE22] | IDt1 [RELAY DEVICE21] |
| IDt1 [RELAY DEVICE21] | IDa1 [LOCATION REGISTRATION AREA 5a] |
| ... | ... |

FIG. 21

LOCATION REGISTRATION TABLE

| IDENTIFICATION INFORMATION | LOCATION INFORMATION |
|---|---|
| IDm1 [MOBILE COMMUNICATION TERMINAL 7-1] | IDt2 [RELAY DEVICE 22] |
| IDm2 [MOBILE COMMUNICATION TERMINAL 7-2] | IDt2 [RELAY DEVICE 22] |
| IDm3 [MOBILE COMMUNICATION TERMINAL 7-3] | IDt2 [RELAY DEVICE 22] |
| ... | ... |
| IDt2 [RELAY DEVICE 22] | IDt1 [RELAY DEVICE 21] |
| IDt3 [RELAY DEVICE 23] | IDt1 [RELAY DEVICE 21] |
| IDt1 [RELAY DEVICE 21] | IDa1 [RELAY DEVICE 5a] |
| ... | ... |

LOCATION REGISTRATION TABLE

| IDENTIFICATION INFORMATION | LOCATION INFORMATION |
|---|---|
| IDm1 [MOBILE COMMUNICATION TERMINAL 7-1] | IDt3 [RELAY DEVICE 23] |
| IDm2 [MOBILE COMMUNICATION TERMINAL 7-2] | IDt3 [RELAY DEVICE 23] |
| IDm3 [MOBILE COMMUNICATION TERMINAL 7-3] | IDt3 [RELAY DEVICE 23] |
| ... | ... |
| IDt2 [RELAY DEVICE 22] | IDt1 [RELAY DEVICE 21] |
| IDt3 [RELAY DEVICE 23] | IDt1 [RELAY DEVICE 21] |
| IDt1 [RELAY DEVICE 21] | IDa1 [LOCATION REGISTRATION AREA 5a] |
| ... | ... |

METHOD FOR MANAGING LOCATION INFORMATION, RELATED RELAY DEVICE AND LOCATION INFORMATION MANAGEMENT DEVICE

FIELD OF THE INVENTION

The present invention is directed to a method for managing location information designating an area in which a mobile communication device is located, and is also directed to a related relay device, location information management device, and a mobile communication system. More particularly, the method of the present invention enables location registration of a mobile communication device to be readily and effectively carried out in a mobile communication network.

DESCRIPTION OF THE PRIOR ART

In a well-known method for effecting location registration of a mobile communication terminal in a network, location information of, for example, a cellular telephone, is registered in a memory storage device (hereinafter referred to as a location register or a location information management device) provided in a node of a mobile communication network. Consequently, a mobile communication terminal in the network can be contacted regardless of a location registration area in which it is currently located within the network. In more detail, in a network area for a mobile communication service that is sectioned into a plurality of location registration areas, when a mobile communication terminal moves from one location registration area to another, a location registration request specifying the new location registration area of the terminal is transmitted from the terminal to the location register. On the basis of the location registration request, location information of the requesting terminal stored in the location register is updated.

In a case that a number of users of mobile communication terminals of a network is traveling in a train, and the train moves from one location registration area to another, requests for location registration are transmitted from each of the number of mobile communication terminals to the location register in the mobile communication network. As a result, the communication network is subject to a surge in traffic.

A system for coping with such a situation is proposed, for example, in Japanese Patent Application Laid-Open Publication No. 11-355835, in which location registration requests from a plurality of mobile communication terminals moving on a train are integrated into a single location registration request that is transmitted from a communication device installed in the train. In such a system, the communication device functions as a virtual base station for a plurality of mobile communication terminals. Thus, when a user of a mobile communication terminal boards a train, the terminal receives identification information of the communication device, and the mobile communication terminal transmits, to the location register in the network, a location registration request including the received identification information. From this time onward, location information of the mobile communication terminal is updated on the basis of location information of the communication device as the device moves between location registration areas. Consequently, it is not necessary for a plurality of mobile communication terminals to send a location registration request to update location information individually, and as a result, surges in communication traffic can be avoided when terminals move between location registration areas.

However, a drawback of the system of the above publication is that in a case that a user of a mobile communication terminal disembarks from a train, it becomes necessary for the terminal to transmit a location registration request. In a place such as a major station in a city where a large number of people may disembark at any given time from a train, a large number of mobile communication terminals may transmit location registration requests simultaneously, thereby leading to a surge in network traffic.

SUMMARY OF THE INVENTION

In view of the stated problem of the prior art, it is an object of the present invention to provide a method for effectively preventing surges in network traffic that would otherwise arise as a result of concentrations of transmission requests being transmitted by mobile communication devices when such devices move between location registration areas. A system related to the method of the present invention includes mobile communication terminals served by a mobile communication network.

In one preferred embodiment of the present invention, there is provided a first method for managing location information for identifying an area in which a mobile communication device is located, the method being used in a mobile communication network serving a plurality of mobile communication devices and comprising: storing, in a case that among the plurality of mobile communication devices a master/slave relationship is established between two mobile communication devices, identification information of the device acting as a master device, which information functions as location information for the other of the two devices acting as a slave device; storing, in a case that a mobile communication device is not currently in a dependency relation with any other of the plurality of mobile communication devices, identification information of a location registration area in which the mobile communication device is currently located, the location information being stored in a location information management device; transmitting, in a case that a master/slave relationship existing between the two devices should be discontinued, from the mobile communication device acting as a master device to the location information management device, a dependency registration removal request specifying the mobile communication device acting as a slave device; and updating, in the location information management device, location information of the mobile communication device acting as a slave device specified in the dependency registration removal request, to identification information of a location registration area in which the mobile communication device acting as a master device is currently located.

According to the above method of the present invention, in a case that a master/slave relationship between mobile communication devices is to be discontinued, a mobile communication device acting as a master device transmits to a location information management device, a dependency registration removal request specifying the mobile communication device acting as a slave device. Consequently, it is not necessary for a mobile communication device acting as a slave device to transmit a dependency registration removal request individually.

In another preferred mode of the present invention, there is provided a second method employed when a first master/slave relationship between two mobile communication devices is to be discontinued and a second master/slave relationship is established between a device acting as a slave device in the first relationship and another of the plurality of mobile communication devices of the network to act as a master device in the second relationship.

According to the method, in a case that among a plurality of mobile communication devices in the mobile communication network a first master/slave relationship is established between two mobile communication devices, identification information of the device acting as a master device is stored in a location information management device as location information of the other of the two devices acting as a slave device, and in a case that a mobile communication device is not currently in a dependency relation with any other of the plurality of mobile communication devices, identification information of a location registration area in which the mobile communication device is currently located is stored in the location information management device as location information of the device. As required, the mobile communication device acting as a master device in the first master/slave relationship transmits to the location information management device, a dependency registration change request specifying the mobile communication terminal acting as a slave device in the first master/slave relationship and the mobile communication device to act as a master device in the second master/slave relationship. The location information management device, upon receiving the request, updates location information of the mobile communication device acting as a slave device specified in the dependency registration change request to identification information of the mobile communication device to act as a master device of the second master/slave relationship.

According to the second method of the present invention, there is no need for the mobile communication device acting as a slave device to transmit a dependency registration change request individually even in a case that the master device of the mobile communication device acting as a slave device is changed to another mobile communication device.

Preferably, in the first and second methods, a mobile communication device acting as a master device is a relay device installed in a moving object, and another mobile communication device which is in a dependency relation with the mobile communication device acting as a master device is a mobile communication terminal accommodated in the moving object and moving to a new place with the relay device.

In addition to the methods described above, the present invention provides a location information management device, a relay device, and a mobile communication system, each of which is related to the above methods.

BRIEF DESCRIPTION OF THE DRAWINGS

FIG. 1 is a block diagram showing an overall configuration of a mobile communication system according to a first embodiment of the present invention.

FIG. 2 is a block diagram showing a configuration of a relay device according to the embodiment.

FIG. 3 is a block diagram showing a configuration of a location register according to the embodiment.

FIG. 4 shows details of a location registration table according to the embodiment.

FIG. 6 is a sequence chart showing an operation for subordinating mobile communication terminals to a relay device.

FIG. 7 shows details of the location registration table after the operation of FIG. 6 is completed.

FIG. 8 is a conceptual diagram showing a master/salve relationship between the relay device and mobile communication terminals after the operation of FIG. 6 is completed.

FIG. 9 is a sequence chart showing an operation in a case that the relay device moves to another location registration area according to the embodiment.

FIG. 10 shows details of the location registration table after the operation of FIG. 9 is completed.

FIG. 12 shows details of the location registration table after the operation of FIG. 11 is completed.

FIG. 13 is a conceptual diagram showing a master/slave relationship between the relay device and mobile communication terminals after the operation of FIG. 11 is completed.

FIG. 14 is a sequence chart showing an operation of discontinuing a master/slave relationship between the relay device and mobile communication terminals according to a modification of the embodiment.

FIG. 15 is a conceptual diagram showing a relationship between relay devices and mobile communication terminals according to a second embodiment of the present invention.

FIG. 16 shows details of a location registration table according to the embodiment.

FIG. 18 shows details of the location registration table after the operation of FIG. 17 is completed.

FIG. 21 shows details of the location registration table according to the modification.

DESCRIPTION OF THE PREFERRED EMBODIMENTS

Figure 5:
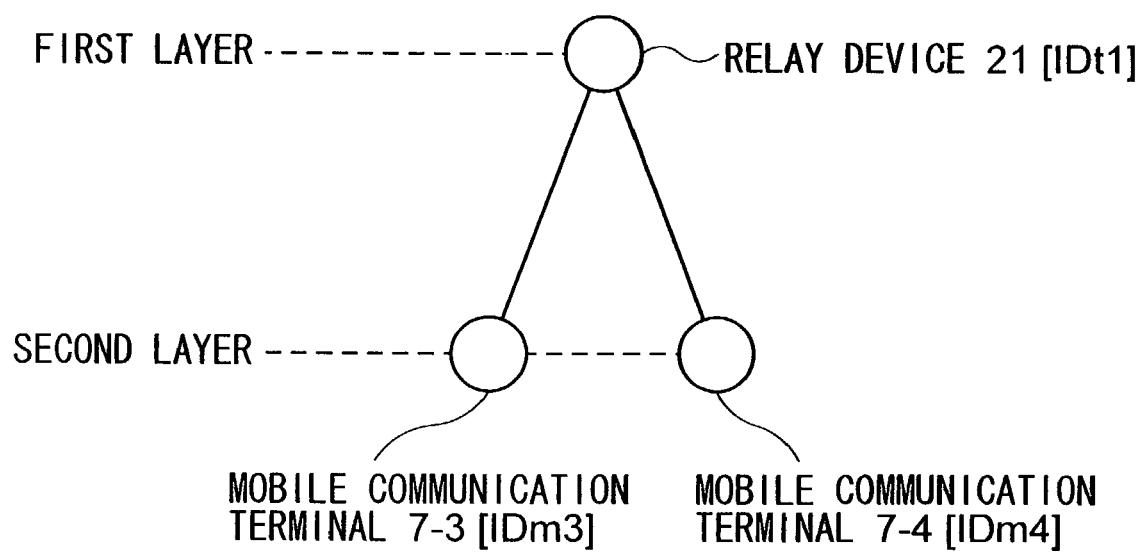
FIG. 5 is a conceptual diagram showing a master/slave relationship between a relay device and mobile communication terminals according to the embodiment.

The method and device of managing location information according to first and second embodiments provide an effective way of updating location information of a plurality of mobile communication devices. The method and device prevent network traffic from increasing as a result of location registration relating to a plurality of mobile communication devices when the devices simultaneously move from one location registration area to another. Referring to the drawings, advantages and other functions of the method and devices of the present invention will be described.

A. First Embodiment

A-1. Configuration of First Embodiment

FIG. 1 is a block diagram showing an overall configuration of a mobile communication system according to an embodiment of the present invention. As shown in the figure, the mobile communication system comprises a mobile communication network 1, a relay device 21 installed in a moving object 2, and one or a plurality of mobile communication terminals 7. Moving object 2 is a transportation means such as a train or a bus on which a user of mobile communication terminal 7 is being transported. In the present embodiment, it is assumed that moving object 2 is a train moving along a track 3. Mobile communication terminal 7 is a communication device that can be carried by a user, and includes a cellular telephone, a PHS™ (Personal Handyphone System), and the like.

Mobile communication network 1 provides various mobile communication services including a voice communication service and a data communication service to each mobile communication terminal 7 located in a communication service area of network 1. Network 1 includes a plurality of radio base stations 11-1, 11-2, . . . , a plurality of switches 12-1, 12-2, . . . , and a location register 13. It is to be noted that, in the following description, radio base stations 11-1, 11-2, . . . will be denoted as "base station 11" and a plurality of switches 12-1, 12-2, . . . will be as "switch 12" unless it is required to specify one of the base stations or switches. Further, for the sake of simplicity, there are shown, in FIG. 1, only six radio base stations 11, two switches 12, and one location register 13, but it is to be noted that, in practice, a larger number of radio base stations 11, switches 12, and location registers 13 are included in network 1. Similarly, only one moving object 2 is shown in FIG. 1, but in practice there are more moving objects 2, each having a relay device installed.

Each radio base station 11 is cited at a predetermined interval, and each one covers a radio area 4 (denoted as "4a" to "4f" in FIG. 1). Each radio area 4 is an area where wireless communication can be performed in an area covered by radio base station 11.

Switch 12, as shown in FIG. 1, is connected to one or a plurality of radio base stations 11, and performs a call-connection process in response to a termination request to and an origination request from each mobile communication terminal 7. Further, switch 12 manages a location registration area 5 (denoted as "5a" and "5b" in FIG. 1) comprising radio areas 4 covered by one or a plurality of radio base stations 11 connected to switch 12 itself. In the case of transmitting a termination request to a mobile communication terminal 7, it is first identified in which location registration area 5 the mobile communication terminal 7 is located, and the termination request is transmitted from all radio base stations 11 belonging to the identified location registration area 5. In other words, location registration area 5 comprises a range within which a termination request is to be transmitted.

A plurality of radio base stations 11 broadcasts at a predetermined interval, a base station information signal within a radio area 4 covered by each base station 11, via a control channel. Included in the signal is area identification information of a location registration area 5 to which each base station 11 belongs. Each mobile communication terminal 7 receives the signal, thereby identifying a location registration area 5 in which the terminal 7 itself is currently located. In the case of moving from one location registration area 5 to another, the terminal 7 transmits a location registration request to location register 13.

FIG. 2 is a block diagram showing a configuration of moving object 2, in which there are shown only elements relating to the mobile communication system of the present invention. As shown in the figure, a relay device 21 is installed in moving object 2, so moving object 2 and relay device 21 move together. In other words, relay device 21 moves to a new location with one or a plurality of mobile communication terminals 7 accommodated in moving object 2. Relay device 21, as shown in FIG. 2, comprises a signal transmitter/receiver 211, a controller 212, and a storage unit 213.

Signal transmitter/receiver 211 comprises an antenna 211a and an antenna 211b. Antenna 211a is used for wireless communication with a radio base station 11 covering a radio area 4 where a relay device 21 is located. In other words, signal transmitter/receiver 211 outputs, to controller 212, a signal received from a radio base station 11 through antenna 211a, while transmitting a signal supplied from controller 212 to a radio base station 11 through antenna 211a. Antenna 211b is used for wireless communication with mobile communication terminal(s) 7 accommodated in moving object 2. Signal transmitter/receiver 211 outputs, to controller 212, a signal received from mobile communication terminal 7 through antenna 211b, while transmitting, to terminal(s) 7, a signal supplied from controller 212 through antenna 211b.

Controller 212 comprises, for example, a CPU (Central Processing Unit), and the like. Controller 212 functions as a central control unit of relay device 21. Controller 212 implements various control programs stored in storage unit 213, thereby exchanging various information with signal transmitter/receiver 211 or storage unit 213. Stored in storage unit 213 are various control programs implemented by controller 212, an identifier (hereinafter referred to as "relay device identification information") which is uniquely assigned to relay device 21, and area identification information of a location registration area 5 where the relay device is currently located. Controller 212 receives a base station information signal broadcasted from a radio base station 11 at a predetermined interval, and area identification information stored in storage unit 213 is updated where necessary. Given that relay device 21 moves to a subsequent location with moving object 2, area identification information stored in storage unit 213 is updated by controller 212 every time relay device 21 changes its location from one location registration area 5 to another area 5. In the mean time, controller 212 transmits, to location register 13, a location registration request through signal transmitter/receiver 211.

FIG. 3 is a block diagram showing a configuration of location register 13. Location register 13 is a device for registering each region in which one or a plurality of mobile communication terminals 7 and a relay device 21 is located. As shown in FIG. 3, location register 13 comprises a communication unit 131, a controller 132, and a storage unit 133.

Communication unit 131 performs communication with each switch 12. Controller 132 comprises, for example, a CPU that exchanges various information with communication unit 131 or storage unit 133, and that functions as a central controller of location register 13.

Storage unit 133 has a location registration table stored therein. The location registration table is used for registering a region in which each mobile communication terminal 7 and relay device 21 is located. With reference to the example shown in FIG. 4, the location registration table will now be explained in detail.

As shown in the figure, the location registration table stores terminal identification information (IDm1, IDm2, . . . ) of each mobile communication terminal 7 and location information for identifying a region in which each terminal 7 is currently located, the terminal identification information and the location information being stored in correspondence with each other. In the location registration table according to the present embodiment, as for a mobile communication terminal(s) 7 accommodated in a moving object 2, relay device identification information of relay device 21 installed in the moving object 2 is registered as location information of each mobile communication terminal 7, while, as is the case for a mobile communication terminal(s) 7 located outside a moving object 2, area identification information of a location registration area where each terminal 7 is currently located is registered.

For example, if a mobile communication terminal 7 having a terminal identification "IDm3" is accommodated in a moving object 2, as shown in FIG. 4, relay device identification information "IDt1" of a relay device 21 installed in the moving object 2 is registered as location information associated with terminal identification information "IDm3." On the other hand, if a mobile communication terminal 7 having a terminal identification "IDm1" is located outside a moving object 2 and in location registration area 5a, as shown in FIG. 4, area identification information "IDa1" of location registration area 5a is registered as location information associated with terminal identification information "IDm1."

Further, in the location registration table according to the present embodiment, there is stored not only location information of a mobile communication terminal(s) 7 but also location information of relay device 21. Location information of relay device 21 comprises area identification information of a location registration area where a relay device 21 is currently located. For example, if a relay device 21 having identification "IDt1" is located in a location registration area 5a, as shown in FIG. 4, area identification information "IDa1" of location registration area 5a is registered as location information associated with relay device identification information "IDt1."

Thus, location registration area of a mobile communication terminal 7 can be identified by referring to the location registration table explained above, not only for a mobile communication terminal 7 located outside moving object 2 but also for a terminal 7 located in moving object 2. In other words, in a case that a mobile communication terminal 7 accommodated in a moving object 2, first, relay device identification information corresponding to applicable terminal identification information is identified, and, as indicated by the arrow in FIG. 4, area identification information corresponding to the identified relay device identification information is referred to, and in this way a location registration area of the mobile communication terminal 7 can be identified. In the example shown in FIG. 4, terminal identification information "IDm3" is associated with relay device identification information "IDt1" which is associated with area identification information "IDa1." Thus, a mobile communication terminal 7 having terminal identification information "IDm3" can be identified as being located in a location registration area 5a having area identification information "IDa1."

Thus, even in a case that a mobile communication terminal(s) 7 accommodated in a moving object 2 moves from one location registration area to another, there is no need to update location information of the terminal(s) 7. In other words, no change is recognized as having taken place in a case that the terminal(s) moves to a new location along with the moving object 2 in which a relay device 21 is installed. This is possible since location information of the relay device 21 is updated accordingly when the moving object 2 moves to a new location registration area. Thus, the relay device 21 transmits a location registration request on behalf of a mobile communication terminal(s) 7 accommodated in the moving object 2. This relationship between relay device 21 and mobile communication terminal 7 is referred to as a master/slave relationship in the following description. Accordingly, in a case that mobile communication terminals 7 and relay devices 21 are located such as is shown in the location registration table of FIG. 4, relay device 21 (relay device identification information "IDt1" is regarded as a "master" device belonging to the first layer (top layer), and two mobile communication terminals 7 (terminal identification information "IDm3" and "IDm4") subordinate to the relay device 21 are regarded as "slave" devices belonging to the second layer (bottom layer).

A-2. Operation of First Embodiment

Operation of the first embodiment will now be explained hereinbelow. The following description will be given in three parts: (1) an operation of subordinating mobile communication terminal 7 to relay device 21; (2) an operation performed when relay device 21 moves from one location registration area to another in a state that a plurality of mobile communication terminals 7 are subordinate to relay device 21; and (3) an operation of discontinuing a master/slave relationship between relay device 21 and mobile communication terminal 7.

(1) Operation of Subordinating Mobile Communication Terminal 7 to Relay Device 21

It is assumed here that mobile communication terminals 7-1 (terminal identification information: "IDm1") and 7-2 (terminal identification information: "IDm2") are currently located in a location registration area 5a. Also, two mobile communication terminals 7-3 (terminal identification information: "IDm3") and 7-4 (terminal identification information: "IDm4") are subordinate to relay device 21 (i.e. the terminals 7-3 and 7-4 are accommodated in a moving object 2). Thus, as shown in FIG. 4, location information of each terminal 7-1 and 7-2 is registered as "IDa1"; and location information of each terminal 7-3 and 7-4 is registered as "IDt1."

It is further assumed that the mobile communication terminals 7-1 and 7-2 will become newly subordinate to relay device 21 (i.e. mobile communication terminals 7-1 and 7-2 will move into moving object 2), and the operation thereof will be explained below.

As shown in FIG. 6, relay device 21 broadcasts a relay device information signal in moving object 2 at predetermined intervals (step Sa1). In the signal, relay device identification information (it is assumed here as "IDt1") of the relay device 21 is included. The terminals 7-1 and 7-2, upon moving inside moving object 2 from location registration area 5a, receive the relay device information signal, and are thereby identified as being accommodated in moving object 2. The terminals 7-1 and 7-2 then transmit to the relay device 21 a dependency registration request (step Sa2 and Sa3), including terminal identification information of a mobile communication terminal 7 transmitting the request (i.e. "IDm1" or "IDm2"). The relay device 21, upon receiving the dependency registration request, transmits a response to each of the transmitter terminals 7-1 and 7-2 (step Sa4). Mobile communication terminals 7-1 and 7-2 having moved in moving object 2 receive the response, thereby identifying itself being subordinate to the relay device 21 (step Sa5). After this, mobile communication terminals 7-1 and 7-2 do not perform a location registration requesting process even in a case that they move from one location registration area to another, unless the master/slave relationship with the relay device 21 is discontinued.

After transmitting the response to the terminals, the relay device 21 transmits a dependency registration request to location register 13 (step Sa6). The dependency registration request is a signal requesting location register 13 to update the location registration table on the basis of the master/slave relationship existing between the relay device 21 and each of terminals 7-1 and 7-2, the signal including relay device identification information "IDt1" of the relay device 21 and terminal identification information "IDm1" and "Dm2" of respective mobile communication terminals 7-1 and 7-2, which are newly registered under the relay device 21 as its slave terminals. The dependency registration request is routed via radio base station 11 where the relay device 21 is currently located, and then switch 12, and finally reaches location register 13.

Upon receiving the dependency registration request, location register 13 updates the location registration table (step Sa7). Specifically, terminal identification information "IDm1" and "IDm2" included in the received request are retrieved from the table. Location information associated with the retrieved terminal identification information is updated to relay device identification information "IDt1" included in the received request for dependency registration. As a result, as shown in FIG. 7, location information for each of terminal identification information "IDm1" and "IDm2" is now changed to relay device identification information "IDt1." It is noted that the updated portions are hatched in location registration tables in FIG. 7, and will be in FIG. 10, 12, 18, and 23 that follow.

The new master/slave relationship is shown in FIG. 8. As shown, the mobile communication terminals 7-1 and 7-2 are now subordinate to relay device 21 in addition to the terminals 7-3 and 7-4 which remain subordinate to device 21, as in the previous state shown in FIG. 5. Location register 13, once it completes the updating of the location registration table, transmits, to relay device 21, a response for dependency registration (step Sa8).

(2) Operation Performed when Relay Device 21 Moves from One Location Registration Area to Another Next, referring to FIG. 9, an explanation will be given on an operation when relay device 21 moves from one location registration area 5 to another in a state that four mobile communication terminals 7-1 to 7-4 are subordinate to relay device 21. It is assumed here that device 21 moves from a radio area 4*c* in a location registration area 5*a* to a radio area 4*d* in a location registration area 5*b* (refer to FIG. 1).

Relay device 21, after moving from radio area 4*c* to 4*d*, first receives a base station information signal from a radio base station 11-4 covering radio area 4*d* (step Sb1). As described above, the base station information signal includes area identification information (assumed here to be "IDa2") of location registration area 5*b*. Relay device 21, upon receiving the base station information signal, detects that the device has moved to a new location registration area 5 since the area identification information "IDa2" included in the signal is different from area identification information "IDa1" representing location registration area 5*a*, the area identification information "IDa1" having been stored in storage unit 213 (step Sb2). As a result, relay device 21 transmits a location registration request to location register 13 (step Sb3). The location registration request indicates that location information of relay device 21 is to be updated, and includes relay device identification information "IDt1" of device 21 and area identification information "IDa2" of location registration area 5*b* as of after moving. It is to be noted, as described above, that mobile communication terminals 7 subordinate to relay device 21 do not, in any case, transmit a location registration request individually, even when detecting a change of location registration area.

Upon receiving the location registration request through radio base station 11-4 and switch 12-2, location register 13 updates the location registration table according to the request (step Sb4). Specifically, location register 13 retrieves relay device identification information "IDt1" included in the request from the location registration table, and updates location information associated with the retrieved relay device identification information to area identification information "IDa2" included in the request. As a result, the location registration table shown in FIG. 7 is updated to that shown in FIG. 10. Subsequently, location register 13 transmits to relay device 21 a location registration response indicating update completion of the table (step Sb5).

(3) Operation of Discontinuing Master/slave Relationship between Relay Device 21 and Mobile Communication Terminal 7

Figure 11:
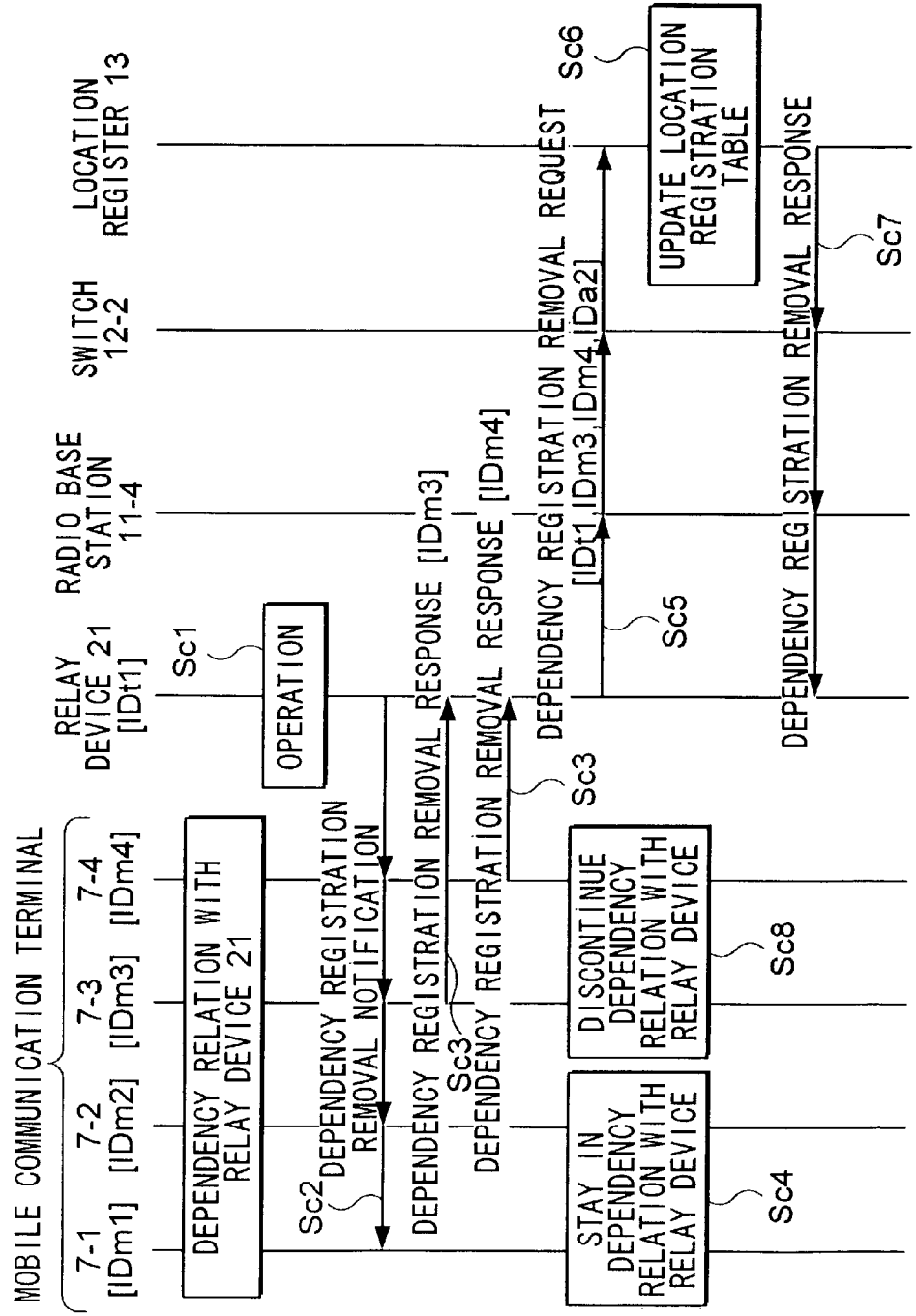
FIG. 11 is a sequence chart showing an operation of discontinuing the master/slave relationship between the relay device and mobile communication terminals.

Next, with reference to FIG. 11, explanation will be given of an operation employed in discontinuing the master/slave relationship between relay device 21 and mobile communication terminal 7, focusing on a situation wherein a plurality of mobile communication terminals are in a subordinate relation to device 21, and some, but not all of those terminals discontinue their relation with device 21. It is assumed here that moving object 2 arrives at a station within location registration area 5*b* and users each carrying the terminal 7-3 and 7-4, respectively, disembark from moving object 2. When the users disembark from moving object 2, the master/slave relationship between relay device 21 and each terminal 7-3 and 7-4 is discontinued.

When moving object 2 arrives at the station, the driver of moving object 2 performs a predetermined operation input to relay device 21. When the operation input is detected (step Sc1), relay device 21 transmits a dependency registration removal notification to all mobile communication terminals in moving object 2 (step Sc2). Among a plurality of mobile communication terminals 7, the terminal 7-3 and 7-4 to be removed transmit to relay device 21 a dependency registration removal response including their own terminal identification information (step Sc3). On the other hand, the terminals 7-1 and 7-2 do not transmit the removal response, and thus the master/slave relationship with relay device 21 is maintained (step Sc4).

One example of how it is determined whether mobile communication terminal 7 transmits a dependency registration removal response in response to the notification is as follows:

Mobile communication terminal 7 stores a time schedule of its user. In the schedule, information on when the user will disembark from a train is included. In a case that a time of receipt of the dependency registration removal notification is within a predetermined time period including the scheduled time, mobile communication terminal 7 determines that the dependency registration with relay device 21 is to be removed, and transmits a dependency registration removal response. It will be obvious to those skilled in the art that the determination in question is not limited to use in the method described, and various modifications within the present invention can be envisaged. For example, mobile communication terminal 7 may notify its user of receipt of a dependency registration removal notification, and when a predetermined operation is performed by the user, the terminal transmits to relay device 21 a dependency registration removal response.

Next, relay device 21 receives a dependency registration removal response transmitted in step Sc3 from the terminal 7-3 and 7-4. Upon receiving the response, relay device 21 transmits, to location register 13, a dependency registration removal request through radio base station 11-4 and switch 12-2 (step Sc5). The request indicates that the master/slave relationship with relay device 21 is to be discontinued with respect to mobile communication terminal 7 which has transmitted the dependency registration removal response to device 21; and the request includes: terminal identification information "IDm3" and "IDm4" of the mobile communication terminals 7 with respect to which the master/slave relationship is to be discontinued; relay device identification information "IDt1" of relay device 21; and area identification information "IDa2" of a location registration area where relay device 21 is currently located.

Upon receiving a dependency registration removal request, location register 13 updates the location registration table (step Sc6). Specifically, location register 13 retrieves terminal identification information "IDm3" and "IDm4" included in the request from the location registration table, and location information associated with the retrieved terminal identification information is updated to area identification information "IDa2." As a result, the location registration table shown in FIG. 10 is updated to what is shown in FIG. 12. Also, as shown in FIG. 13, only mobile communication terminals 7-1 and 7-2 (i.e. mobile communication terminals 7 which did not transmit a removal response in step Sc3) are subordinate terminals of relay device 21, while the terminals 7-3 and 7-4 are now independent from relay device 21. The updating of the location registration table is thus performed, and location register 13 transmits, to relay device 21, a dependency registration removal response indicating that the removal of dependency registration has been completed (step Sc7).

Each of the terminals 7-3 and 7-4 which are now independent from relay device 21 (step Sc8) receives a base station information signal from radio base station 11-4, thereby identifying location registration area 5b where the terminal itself is currently located. At this stage, the location information of the terminals in the location registration table is already updated to area identification information of location registration area 5b as shown in FIG. 12, and therefore, there is no need for the terminals 7-3 and 7-4 to perform location registration. Thus, the terminals 7-3 and 7-4 are programmed so as not to transmit a first location registration request, if it is immediately after the dependency registration is moved, for registration under a location registration area 5b whose area identification information is notified from radio base station 11-4. When each mobile communication terminal 7 further moves to a new location registration area in a subsequent step, each terminal 7 individually transmits a location registration request.

According to the present embodiment, as described above, a location registration request from relay device 21 represents location registration requests from a plurality of mobile communication terminals 7 accommodated in moving object 2, so there is no need for each of terminals 7 to transmit a location registration request individually. Thus, even in a case that a plurality of mobile communication terminals 7 simultaneously move to a new location registration area, it is possible to minimize traffic between each terminal 7 and location register 13.

Further, in the present embodiment, location register 13 receives a dependency registration removal request from relay device 21, whereby a master/slave relationship between one or more of a plurality of mobile communication terminals 7 and a relay device 21 is discontinued. Thus, there is no need for each terminal 7 leaving moving object 2 to transmit a location registration request individually; so even in a case that a number of passengers each carrying a mobile communication terminal 7 disembark all at once from a train at a station, a surge in traffic can be avoided.

In the above-described first embodiment, mobile communication terminal(s) 7 having transmitted a dependency registration removal response to relay device 21 is determined as one whose master/slave relationship with relay device 21 is to be discontinued. However, relay device 21 may also identify which mobile communication terminal(s) 7 is to be removed from dependency registration, and transmit a dependency registration removal notification specifying each terminal 7 that has been identified. For example, a dependency registration removal notification may be transmitted to applicable terminal 7 when it reaches a time at which each mobile communication terminal 7 is scheduled to leave moving object 2.

Specifically, as shown in FIG. 14, when a predetermined operation is performed by a driver of moving object 2 when it arrives at a station (step Sc1), relay device 21 refers to information stored in storage unit 213 and extracts terminal identification information of the terminals 7-3 and 7-4 whose users are to disembark from moving object 2. Device 21 then broadcasts in moving object 2 a dependency registration removal notification including terminal identification information "IDm3" and "IDm4" (step Sc2'). Then, relay device 21 transmits, to location register 13, a dependency registration removal request including the terminal identification information specified in the notification (step Sc5). The subsequent steps taken are the same as those described in the first embodiment. It is to be noted that, in FIG. 14, like steps are assigned the same reference numerals as used in FIG. 11.

B: Second Embodiment

Next, a second embodiment of the present embodiment will be described. Among elements in a mobile communication system of the present embodiment, the configurations of a mobile communication network 1 and a relay device 21 are the same as those of the above first embodiment, and therefore, explanation thereof will be omitted.

In the above first embodiment, a two-layer master/slave relationship is formed as shown in FIG. 5. In the present embodiment, a three-layer master/slave relationship is established as shown in FIG. 15. An example of such a relationship could include a ferry boat in the first layer (top layer), a carrier vehicle (e.g. a truck) accommodated in the ferry boat in the second layer (middle layer), and a plurality of mobile communication terminals 7 transported in the carrier vehicle in the third layer (bottom layer). Relay device 22 is installed in the carrier vehicle and moves to a subsequent location with relay device 21 which is installed in the ferry boat; and mobile communication terminals 7 (assumed here to be three terminals 7-1 to 7-3) move to a new place with relay device 22 which is installed in the carrier vehicle. Thus, as shown in FIG. 15, relay device 22 (relay device identification information "IDt2") of the carrier vehicle is made subordinate to relay device 21 (relay device identification information "IDt1") of the ferry boat. Similarly, a plurality of mobile communication terminals 7 is made subordinate to relay device 22 of the carrier vehicle. Location registration of each device is performed based on this three-layer master/slave relationship.

When location registration is performed based on the relationship shown in FIG. 15, location information of each device is registered as shown in the location registration table of FIG. 16. Specifically, relay device identification information "IDt2" of relay device 22 is associated, as location information, with terminal identification information of each of mobile communication terminals 7-1 to 7-3. Similarly, relay device identification information "IDt1" of relay device 21 is associated as location information, with relay device identification information "IDt2" of relay device 22. Also, area identification information "IDa1" of location registration area 5a where relay device 21 is currently located is associated, as location information, with relay device identification information "IDt1" of relay device 21.

In the first embodiment, the master/slave relationship is discontinued when mobile communication terminal 7 subordinate to relay device 21 leaves moving object 2. In contrast, in the present embodiment, the master device of mobile communication terminal 7 is changed to another relay device. Specifically, in the case that a plurality of mobile communication terminals 7-1 to 7-3 are unloaded from the carrier vehicle, and moved to a different place in the ferry boat, the master device of mobile communication terminals 7 is changed from relay device 22 of the carrier vehicle to relay device 21 of the ferry boat.

Figure 17:
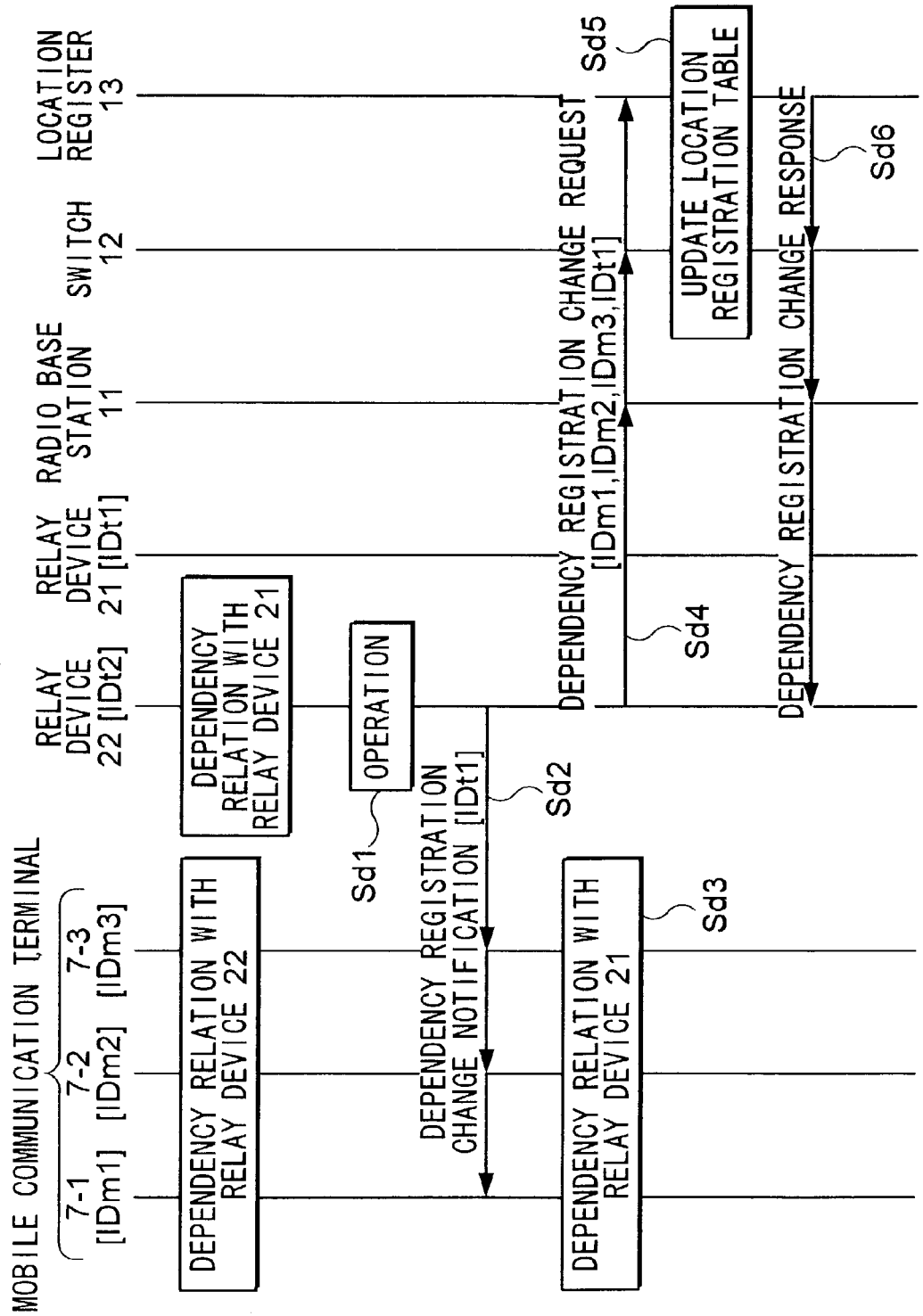
FIG. 17 is a sequence chart showing an operation of changing a master/slave relationship between the relay devices and mobile communication terminals according to the embodiment.

Now, with reference to FIG. 17, explanation will be given on an operation of changing the master device of mobile communication terminals 7-1 to 7-3.

It is assumed here that a three-layer master/slave relationship, as shown in FIG. 15, has been established among relay device 21, relay device 22, and mobile communication terminals 7-1 to 7-3. Accordingly, in storage unit 213 of relay device 22, there are stored relay device identification information "IDt1" of relay device 21 to which relay device 22 is subordinate, and terminal identification information "IDm1", "IDm2", and "IDm3" of mobile communication terminals 7-1 to 7-3, each of which terminals is subordinate to relay device 22.

When mobile communication terminals 7-1 to 7-3 are moved, from the carrier vehicle with relay device 22 installed, to another location in the ferry boat, a predetermined operation is performed to relay device 22. In detecting the operation (step Sd1), relay device 22 in the carrier vehicle transmits a dependency registration change notification to mobile communication terminals 7-1 to 7-3 subordinate to relay device 22 (step Sd2). The dependency registration change request indicates that the master device of each mobile communication terminal 7 is to be changed to another device, and the request includes relay device identification information "IDt1" of relay device 21, which will be a new master device after the change is made. Upon receiving the request, each of terminals 7-1 to 7-3 recognizes that its own master device will be changed to relay device 21 (step Sd3).

Relay device 22 installed in the carrier vehicle transmits, to location register 13, a dependency registration change request (step Sd4). The dependency registration change request indicates that the master device of mobile communication terminals 7-1 to 7-3 is to be changed to a new device, and includes terminal identification information "IDm1", "IDm2", and "IDm3" whose master device is to be changed, and relay device identification information "IDt1" of relay device 21 to which terminals 7 will be subordinate after the change is made. The dependency registration change request is received by location register 13 through radio base station 11 and switch 12.

Figure 19:
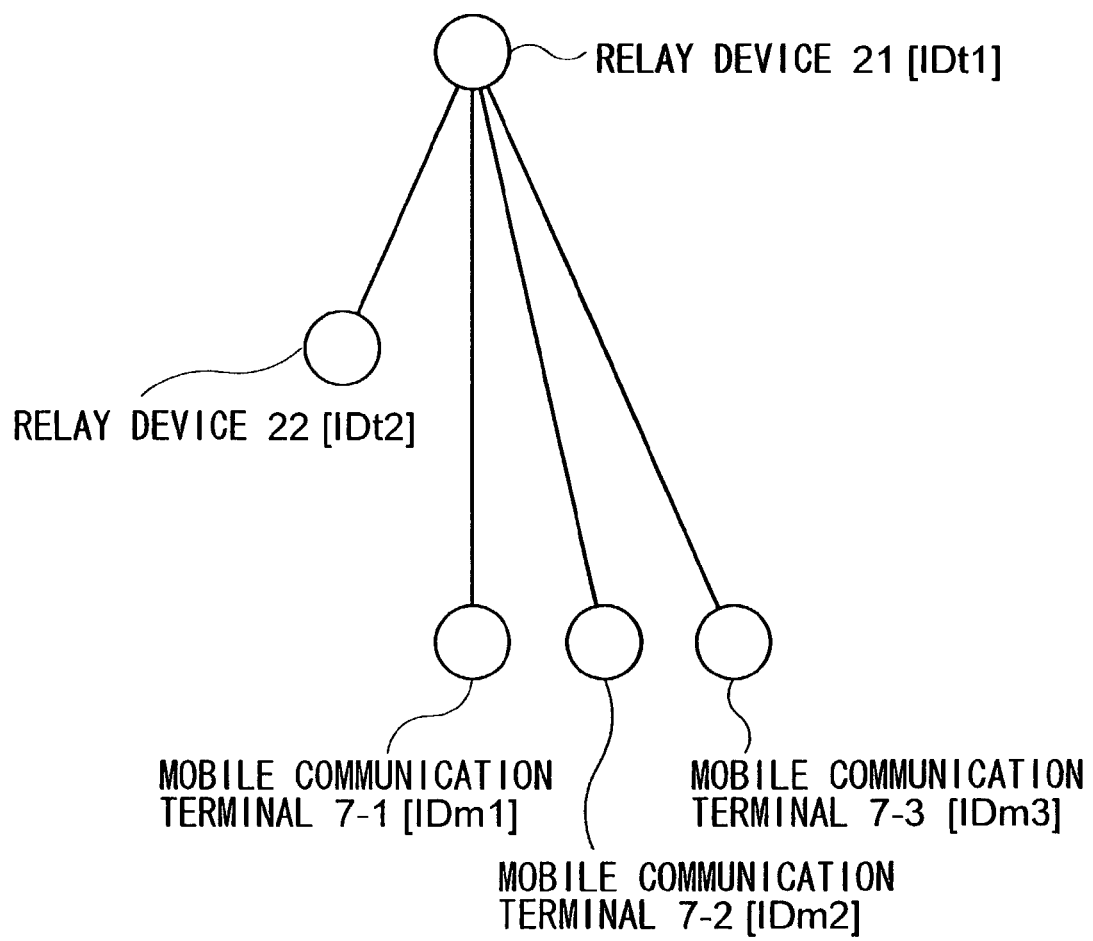
FIG. 19 is a conceptual diagram showing a master/slave relationship between the relay devices and mobile communication terminals after the operation of FIG. 17 is completed.

Upon receiving the dependency registration change request from relay device 22, location register 13 updates the location registration table on the basis of the request (step Sd5). Specifically, controller 132 of location register 13 retrieves, from the location registration table, terminal identification information "IDm1", "IDm2", and "IDm3" of the terminals 7-1 to 7-3 specified in the request, and, as shown in FIG. 18, updates location information associated with each of the retrieved terminal identification information to relay device identification information of relay device 21 specified in the request. As a result, the master/slave relationship shown in FIG. 15 is changed to that shown in FIG. 19. As shown in FIG. 18, location information of the terminals 7-1 to 7-3 is changed from relay device identification information of relay device 22 to that of relay device 21. Subsequently, location register 13 transmits, to relay device 22, which has transmitted the dependency registration change request, a dependency registration change response indicating the completion of the change in the location registration table.

Thus, in the present embodiment, relay device 22 transmits a request for dependency registration change on behalf of all the mobile communication terminals 7 whose master device is to be changed, with relay device 22 being the present master device of terminals 7. Therefore, it is not necessary for each mobile communication terminal 7 to transmit individually a dependency registration change request, whereby a surge in traffic of mobile communication network 1 can be avoided.

Furthermore, in the present embodiment, even in a case that a mobile communication terminal(s) 7 is removed from a relay device (i.e. the carrier vehicle in the above example), location information of each terminal 7 is automatically changed to relay device identification information of a new relay device (i.e. the ferry boat). Thus, the present embodiment, compared with the first embodiment, enables a greater reduction in control traffic generated by location registration requests.

In the present embodiment, the master device of each mobile communication terminal 7 is shifted from relay device 22 to relay device 21 to which relay device 22 is subordinate, but the present invention is not limited thereto.

Figure 20:
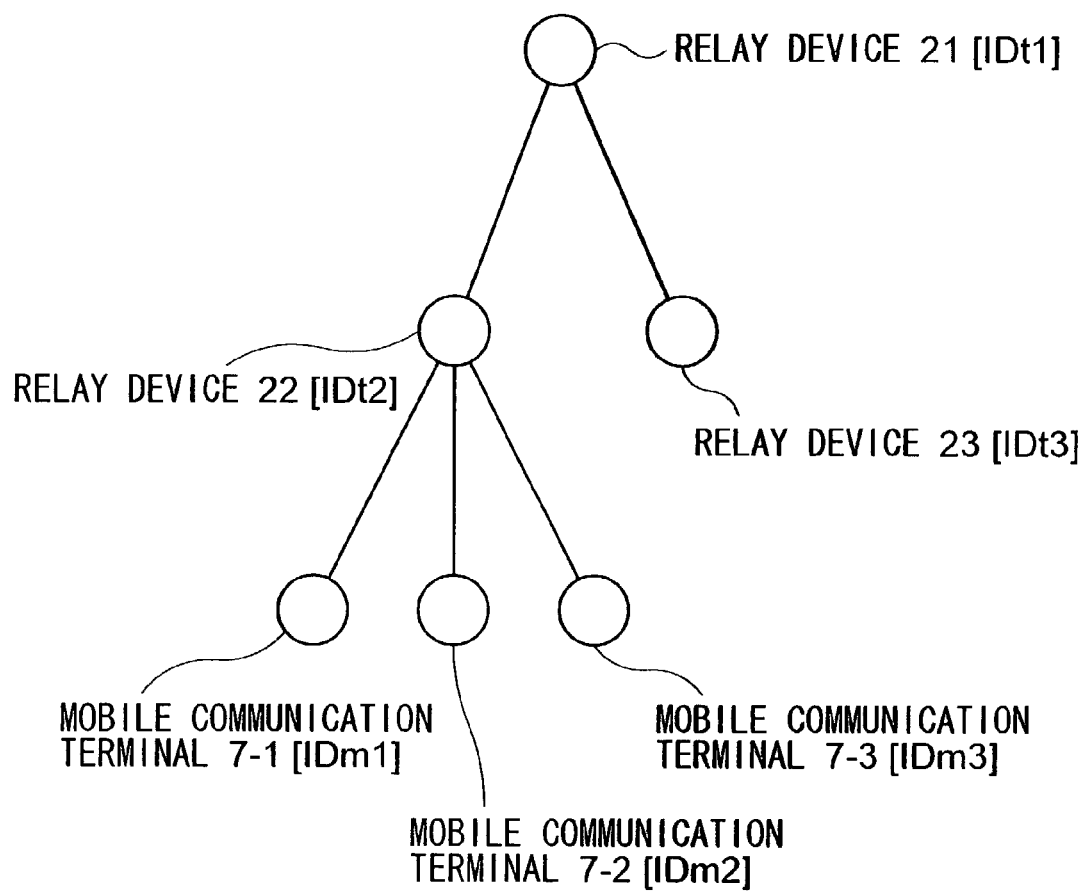
FIG. 20 is a conceptual diagram showing a relationship between relay devices and mobile communication terminals according to a modification of the second embodiment.

For example, it is assumed here that, as shown in FIG. 20, relay devices 22 and 23 are subordinate to relay device 21, and that three mobile communication terminals 7-1 to 7-3 are subordinate to relay device 22. To apply the same situation as stated above, relay device 21 is installed in the ferry boat; relay devices 22 and 23 are installed in carrier vehicles A and B, respectively; and terminals 7-1 to 7-3 are accommodated in carrier vehicle A in which relay device 22 is installed. FIG. 21 shows a location registration table corresponding to the given situation. Specifically, relay device identification information "IDt2" of relay device 22 is registered as location information of terminals 7-1 to 7-3; and relay device identification information "IDt1" of relay device 21 is registered as location information of relay devices 22 and 23. Also, area identification information "IDa1" of a location registration area where relay device 21 is currently located is registered as location information of relay device 21.

Figure 22:
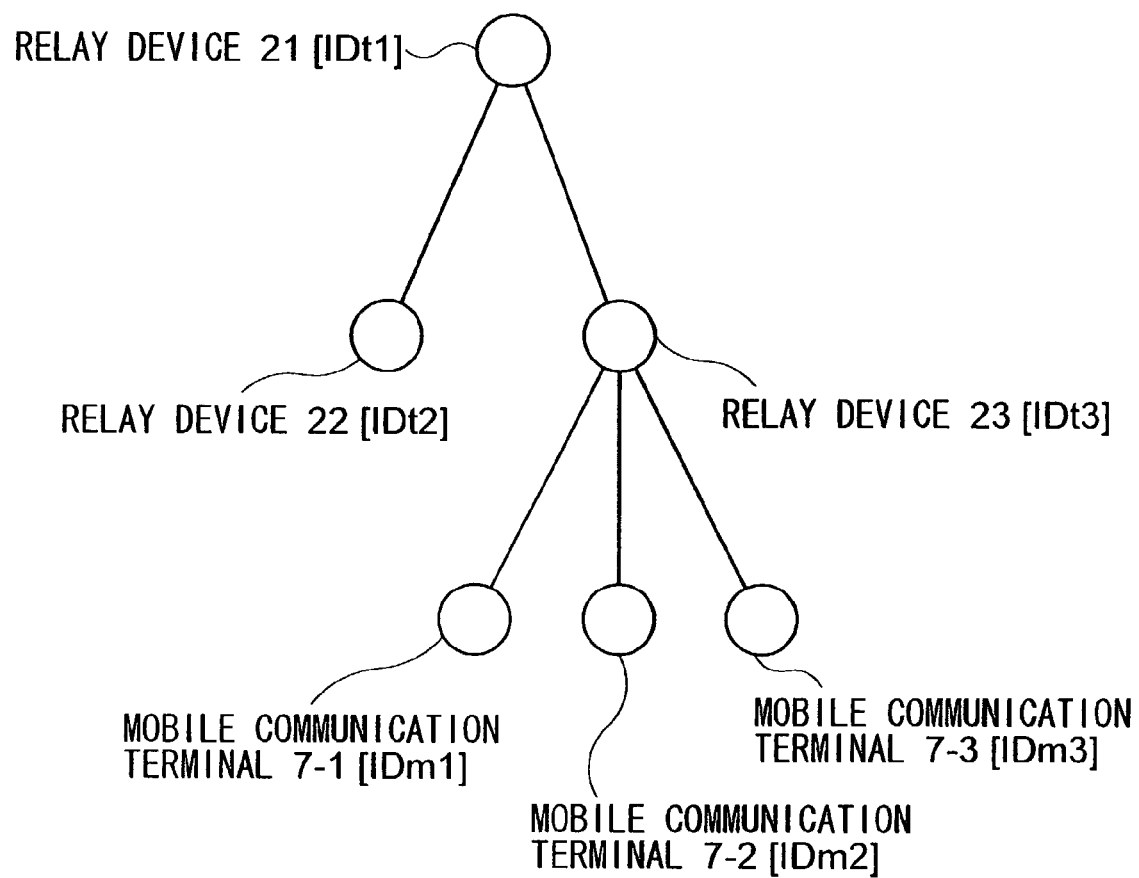
FIG. 22 is a conceptual diagram showing a master/slave relationship between the relay devices and mobile communication terminals after the relationship shown in FIG. 20 has been changed.
Figure 23:
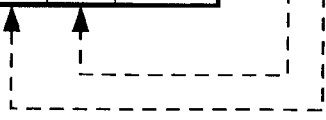
FIG. 23 shows details of the location registration table after changes have been made to the same table as shown in FIG. 21.

As shown in FIG. 22, in a case that terminals 7-1 to 7-3 subordinate to relay device 22 are moved from carrier vehicle A to carrier vehicle B, the master device of the terminals is shifted from relay device 22 to 23. Specifically, in step Sd1 of FIG. 17, when a predetermined operation is made to relay device 22 to initiate the dependency registration change, identification information of relay device 23 is input to relay device 22. Further, in step Sd4, relay device 22 transmits, to location register 13, a dependency registration change request including relay device identification information "IDt3" of relay device 23, and location register 13, on the basis of the received request, changes location information of terminals 7-1 to 7-3 to relay device identification information "IDt3" as shown in FIG. 23. It is to be noted that in the case described, the same effects as achieved in the second embodiment can be attained.

In another preferred mode of the present embodiment, the master device may be changed for only some, not all, of mobile communication terminals 7 subordinate to relay device 22. This mode is useful in a situation where some of a plurality of mobile communication terminals 7 are removed from carrier vehicle A in which relay device 22 is installed.

The method described in the first embodiment can be applied in determining, among the plurality of terminals 7, which terminal(s) is to be removed from dependency registration with relay device 22.

Specifically, relay device 22 transmits to all subordinate terminals 7 a dependency registration change notification indicating the change in dependency registration. Those terminal(s) 7 which have responded to the notification are regarded as those requiring the change (refer to FIG. 11). Alternatively, relay device 22 may determine terminals 7 whose master device should be changed. In other words, relay device 22 stores in storage unit 213 a time at which terminal(s) 7 are scheduled to be unloaded from carrier vehicle A, and when the scheduled time is reached, relay device 22 transmits a dependency registration change notification specifying applicable terminal(s) 7 (refer to FIG. 14).

C: Modification

While the present invention has been described in conjunction with specific embodiments thereof, it will be apparent to those skilled in the art that many alternatives, modifications and variations can be realized within the spirit and scope of the invention set out in the appended claims. For example, the following modifications may be envisioned.

C-1: First Modification

In the above embodiments, an operation of removing or changing dependency registration is triggered by a predetermined operation inputted to a relay device (21 or 22). However, the operation of removing or changing dependency registration can be independently performed by the relay device at predetermined timings. For example, assuming that the relay device is installed in a train, an operation for removal or change of dependency registration may be initiated by an event such as the relay device entering a predetermined region the center of which is a station. Examples are as follow:
(a) the relay device stores train schedules, and the operation is performed when a time is reached to move into a particular region;
(b) a center administering train schedules notifies that the train has moved into a particular region, and the relay device performs the operation upon receiving the notification; or
(c) a wireless communication device installed in a station broadcasts a signal in a particular region the center of which is the station, and upon receiving the signal, the relay device performs the operation.

C-2: Second Modification

In the above embodiments, relay devices (21 to 23) are installed in moving objects such as trains, buses, ferry boats, and carrier vehicles (trucks), but the present invention is not limited thereto. For example, a relay device may be mobile in the same way as mobile communication terminal 7. Also, mobile communication terminal 7 may be provided with the functions of a relay device as described above; that is, a particular mobile communication terminal 7 may subordinate neighboring mobile communication terminals 7 as its slave terminals. Thus, a "mobile communication device" as recited in the appended claims may include both a relay device and a mobile communication terminal 7, as described in the embodiments.

It is to be noted here that, as described in the above embodiments, location register 13 stores, as location information of a first relay device or mobile communication terminal 7 that are subordinate to a second relay device, relay device identification information of the second relay device. For a relay device or mobile communication terminal 7 independent of any relay device, area identification information is stored as its location information. When this is described using the generic term "mobile communication device" including both relay devices and mobile communication terminals, it may be recited that location register 13 stores, "in a case that among the plurality of mobile communication devices a master/slave relationship is established between two mobile communication devices, identification information of a mobile communication device acting as a master device, which information functions as location information for the other of the two mobile communication devices acting as a slave device" and stores, "in a case that a mobile communication device is not currently in a dependency relation with any other of the plurality of mobile communication devices, identification information of a location registration area in which the mobile communication device is currently located."

C-3: Third Modification

In the first embodiment, a two-layer master/slave relationship is established; and in the second embodiment, a three-layer master/slave relationship is established. However, the number of layers is not limited thereto.

In the case that a master/slave relationship comprises more than three layers, a mobile communication device (a relay device or a mobile communication terminal) belonging to the first layer (top layer) acts as a master device; a mobile communication device belonging to the second layer (middle layer) acts as a slave device; and a communication device belonging to the third layer (bottom layer) acts as a secondary slave device. In the meantime, the secondary slave device belonging to the third layer may be considered as a slave device in relation to the slave device of the second layer. Thus, whether a communication device acts as "a master device" or "a slave device" is determined on the basis of its relationship with another mobile communication device, not on the basis of a layer to which the mobile communication belongs. Therefore, a mobile communication device is considered to be "a master device" in relation to another mobile communication device that is subordinate to the mobile communication device; and a master device is not necessarily one which belongs to the top layer (the first layer). Similarly, a mobile communication device is considered as "a slave device" in relation to another mobile communication device to which the mobile communication device is subordinate. Thus, in a case that the master/slave relationship comprising three layers is established as shown in FIG. 15, a mobile communication device that is "a slave device" in relation to another mobile communication device may be "a master device" in relation to still another mobile communication device. Relay device 22 shown in FIG. 15 is an example of such a communication device.

Further, "a mobile communication device" that "is not currently in a dependency relation with any other of the plurality of mobile communication devices," as recited in the appended claims includes such a device as belongs to the top layer in a case where a multiple-layer relationship is established. Relay device 21 as shown in FIG. 15 is an example of this kind of a device. The above "mobile communication device" also includes a mobile communication device that does not act as a slave device as it has not established a master/slave relationship with any other of the mobile communication devices served by the mobile communication network. Mobile communication terminals 7-3 and 7-4 as shown in FIG. 13 are examples of this kind.

We claim:

1. A method for managing location information for identifying an area in which a mobile communication device is located, the method being used in a mobile communication network serving a plurality of mobile communication devices, the method comprising:

storing, in a case that among said plurality of mobile communication devices a first master/slave relationship is established between two mobile communication devices, identification information of the device acting as a master device, which information functions as location information for the other of the two devices acting as a slave device, and storing, in a case that a mobile communication device is not currently in a dependency relation with any other of the plurality of mobile communication devices, identification information of a location registration area in which the mobile communication device is currently located, the location information being stored in a location information management device;

transmitting, from said mobile communication device acting as a master device in said first master/slave relationship to said location information management device, in a case that said first master/slave relationship should be discontinued to establish a second master/slave relationship between said mobile communication device acting as a slave device of said first master/slave relationship and another of said plurality of mobile communication devices of the network, said another device to act as a master device of said second master/slave relationship, a dependency registration change request specifying said mobile communication terminal acting as a slave device in said first master/slave relationship and said another mobile communication device to act as a master device in said second master/slave relationship; and updating, in said location information management device, location information of said mobile communication device acting as a slave device specified in said dependency registration change request to identification information of said another mobile communication device to act as a master device of said second master/slave relationship;

wherein said mobile communication device acting as a master device in said first master/slave relationship is in a dependency relation with another of said plurality of mobile communication devices to establish a third master/slave relationship, and said mobile communication device acting as a slave device in said first master/slave relationship is in a dependency relation with the mobile communication device acting as a master device in said third master/slave relationship and acts as a slave device in said second master/slave relationship.

2. The method according to claim 1, wherein a plurality of first master/slave relationships is established, the master device being a single mobile communication device within said plurality of first master/slave relationships, the method further comprising:

in a case that said plurality of first master/slave relationships should be discontinued to establish a plurality of second master/slave relationships, the master device being a single mobile communication device within said plurality of second master/slave relationships, transmitting a dependency registration change notification from said single mobile communication device acting as a master device in said plurality of first master/slave relationships, to all of a plurality of mobile communication devices acting as slave devices corresponding to said plurality of first master/slave relationships, said dependency registration change notification specifying said single mobile communication device to act as a master device in said second master/slave relationships; and wherein said dependency registration change request specifies said all of a plurality of mobile communication devices acting as slave devices in said plurality of first master/slave relationships and said single mobile communication device to act as a master device in said plurality of second master/slave relationships.

3. The method according to claim 1, wherein a plurality of first master/slave relationships is established, the master device being a single mobile communication device within said plurality of first master/slave relationships, the method further comprising:

in a case that said plurality of first master/slave relationships should be discontinued to establish a plurality of second master/slave relationships, the master device being a single mobile communication device within said plurality of second master/slave relationships, transmitting a dependency registration change notification from said single mobile communication device acting as a master device in said plurality of first master/slave relationships, to all of a plurality of mobile communication devices acting as slave devices corresponding to said plurality of first master/slave relationships, said dependency registration change notification indicating the change of dependency registration; and wherein said dependency registration change request specifies among said all of a plurality of mobile communication devices, mobile communication devices which have responded to said dependency registration change notification and said single mobile communication device to act as a master device in said plurality of second master/slave relationships.

4. The method according to claim 1, wherein a plurality of first master/slave relationships is established, the master device being a single mobile communication device within said plurality of first master/slave relationships, the method further comprising:

in a case that said plurality of first master/slave relationships should be discontinued to establish a plurality of second master/slave relationships, the master device being a single mobile communication device within said plurality of second master/slave relationships, transmitting a dependency registration change notification indicating the change of dependency registration from said single mobile communication device acting as a master device in said plurality of first master/slave relationships, said dependency registration change notification specifying one or more of a plurality of mobile communication devices acting as slave devices corresponding to said plurality of first master/slave relationships; and wherein said dependency registration change request specifies said one or more of a plurality of mobile communication devices acting as slave devices and said single mobile communication device to act as a master device in said plurality of second master/slave relationships.

5. The method according to claim 1, wherein said mobile communication device acting as a master device in said first master/slave relationship is a first relay device installed in a first moving object, and a mobile communication device which is in a dependency relation with said mobile communication device acting as a master device in said first master/slave relationship is a mobile communication terminal moving to a new place with said first relay device, said mobile communication terminal being accommodated in said first moving object; and wherein said another mobile communication device to act as a master device in said second master/slave relationship is a second relay device installed in a second moving object, and a mobile communication device which is in a dependency relation with said another mobile, communication device to act as a master device in said second master/slave relationship is a mobile communication terminal moving to a new place with said second relay device, said mobile communication terminal being accommodated in said second moving object.

6. A relay device installed in a moving object capable of transporting a mobile communication device, comprising:

communication means for performing communications with a location information management device which stores as location information of said relay device, identification information for identifying a location registration area where said relay device is currently located and which stores as location information of said mobile communication device between two mobile communication devices, identification information of the device acting as a master device, which information functions as location information for the other of the two devices acting as a slave device, and storing, in a case that a mobile communication device is not currently in a dependency relation with any other of the plurality of mobile communication devices, identification information of a location registration area in which the mobile communication device is currently located; and control means for, in a case that said first master/slave relationship should be discontinued to establish a second master/slave relationship between said mobile communication device acting as a slave device in said first master/slave relationship and another of said plurality of mobile communication devices of the network, said another device to act as a master device in said second master/slave relationship, controlling said location information management device to update location information of a mobile communication device acting as a slave device specified in a dependency registration change request, to identification information of said another mobile communication device to act as a master device in said second master/slave relationship in the case of receiving said dependency registration change request from said mobile communication device acting as a master device in said first master/slave relationship, said request specifying said mobile communication device to be a slave device in said first master/slave relationship and said another communication device to act as a master device in said second master/slave relationship;

said mobile communication device acting as a master device in said first master/slave relationship is in a dependency relation with another of said plurality of mobile communication devices to establish a third master/slave relationship, and said mobile communication device acting as a slave device in said first master/slave relationship is in a dependency relation with the mobile communication device acting as a master device in said third master/slave relationship and acts as a slave device in said second master/slave relationship.

7. A location information management device for managing location information which identifies an area in which a mobile communication device is located, the device being provided in a mobile communication network serving a plurality of mobile communication devices, comprising:

memory storage means for storing said location information of each one of said plurality of mobile communication devices, said memory storage means storing, in a case that among said plurality of mobile communication devices a first master/slave relationship is established in a mobile communication network serving a plurality of mobile communication devices and comprising:

(a) memory storage means for storing said location information of each one of said plurality of mobile communication devices, said memory storage means storing, in a case that among said plurality of mobile communication devices a first master/slave relationship is established between two mobile communication devices, identification information of the device acting as a master device, which information functions as location information for the other of the two devices acting as a slave device, and storing, in a case that a mobile communication device is not currently in a dependency relation with any other of the plurality of mobile communication devices, identification information of a location registration area in which the mobile communication device is currently located; and (b) control means for, in a case that said first master/slave relationship should be discontinued to establish a second master/slave relationship between said mobile communication device acting as a slave device in said first master/slave relationship and another of said plurality of mobile communication devices of the network, said another device to act as a master device in said second master/slave relationship, controlling said location information management device to update location information of a mobile communication device acting as a slave device specified in a dependency registration change request, to identification information of said another mobile communication device to act as a master device in said second master/slave relationship in the case of receiving said dependency registration change request from said mobile communication device acting as a master device in said first master/slave relationship, said request specifying said mobile communication device to be a slave device in said first master/slave relationship and said another communication device to act as a master device in said second master/slave relationship; and a plurality of mobile communication devices which performs communications with said location information management device, wherein said mobile communication device acting as a master device in said first master/slave relationship is in a dependency relation with another of said plurality of mobile communication devices to establish a third master/slave relationship, and said mobile communication device acting as a slave device in said first master/slave relationship is in a dependency relation with the mobile communication device acting as a master device in said third master/slave relationship and acts as a slave device in said second master/slave relationship.

8. A mobile communication system comprising:

a location information management device for managing location information which identifies an area in which a mobile communication device is located, the device being provided transported in said moving object, identification information for identifying said relay device, thereby to subordinate said mobile communication device to said relay device; and control means for, in a case that a first master/slave relationship between said relay device and said mobile communication device should be discontinued to establish a second master/slave relationship between said mobile communication device and another of a plurality of mobile communication devices served by a mobile communication network, said another device to act as a master device, controlling said relay device to transmit a dependency registration change request specifying the mobile communication device acting as a slave device in said first master/slave relationship and said another mobile communication device to act as a master device in said second master/slave relationship, thereby to change said identification information of said relay device acting as a master device in said first master/slave relationship, to identification information of said another mobile communication device to act as a master device in said second master/slave relationship, said identification information of said relay device being stored in said location information management device as location information of said mobile communication device acting as a slave device;

wherein said mobile communication device acting as a master device in said first master/slave relationship is in a dependency relation with another of said plurality of mobile communication devices to establish a third master/slave relationship, and said mobile communication device acting as a slave device in said first master/slave relationship is in a dependency relation with the mobile communication device acting as a master device in said third master/slave relationship and acts as a slave device in said second master/slave relationship.

* * * * *